US012346207B2

(12) United States Patent
Liu et al.

(10) Patent No.: US 12,346,207 B2
(45) Date of Patent: Jul. 1, 2025

(54) CLOUD-BASED DATABASE BACKUP AND RECOVERY

(71) Applicant: Coupang Corp., Seoul (KR)

(72) Inventors: Yang Liu, Beijing (CN); Zhiyong Huang, Seattle, WA (US); Bin Dong, Beijing (CN); Chuanchuan Han, Beijing (CN); Junzhao Zhang, Beijing (CN)

(73) Assignee: COUPANG CORP., Seoul (KR)

( * ) Notice: Subject to any disclaimer, the term of this patent is extended or adjusted under 35 U.S.C. 154(b) by 350 days.

(21) Appl. No.: 17/456,672

(22) Filed: Nov. 29, 2021

(65) Prior Publication Data

US 2022/0188194 A1 Jun. 16, 2022

Related U.S. Application Data

(60) Provisional application No. 63/123,757, filed on Dec. 10, 2020.

(51) Int. Cl.
*G06F 11/14* (2006.01)
*G06F 21/60* (2013.01)

(52) U.S. Cl.
CPC ...... *G06F 11/1451* (2013.01); *G06F 11/1464* (2013.01); *G06F 11/1469* (2013.01); *G06F 21/602* (2013.01); *G06F 2201/84* (2013.01)

(58) Field of Classification Search
CPC ............. G06F 11/1451; G06F 11/1464; G06F 11/1469; G06F 21/602; G06F 2201/84
See application file for complete search history.

(56) References Cited

U.S. PATENT DOCUMENTS

| 8,595,191 B2 | 11/2013 | Prahlad et al. |
| 9,940,203 B1 | 4/2018 | Ghatnekar et al. |
| 10,628,270 B1 | 4/2020 | Bajaj et al. |
| 10,656,876 B1 | 5/2020 | Guturi et al. |

(Continued)

FOREIGN PATENT DOCUMENTS

CN 111061433 A 4/2020

OTHER PUBLICATIONS

Notification of Transmittal of the International Search Report and The Written Opinion of the International Searching Authority, or the Declaration date of mailing Mar. 15, 2022, for International Application No. PCT/IB2021/061524. (8 pgs).

*Primary Examiner* — Tony Wu
(74) *Attorney, Agent, or Firm* — FINNEGAN, HENDERSON, FARABOW, GARRETT & DUNNER, LLP

(57) ABSTRACT

A system for database backup including a controller, a metadata database coupled to the controller, a backup tool coupled to the controller, and a plurality of nodes coupled to the backup tool and accessed through a file system. The controller is configured to determine a first data change in node; in response to determining the first data change, freeze the file system; and generate an incremental snapshot of the at least one of the plurality of nodes (where the incremental snapshot including a portion of the at least one of the plurality of nodes). The controller is also configured to upload an encrypted copy of the incremental snapshot to a cloud storage; update the metadata database by storing an entry associating the incremental snapshot with the at least one of the plurality of nodes and unfreezing the file system.

18 Claims, 23 Drawing Sheets

(56) References Cited

U.S. PATENT DOCUMENTS

| | | | | |
|---|---|---|---|---|
| 2003/0182325 A1* | 9/2003 | Manley | ............... | G06F 11/2074 |
| | | | | 714/E11.107 |
| 2004/0139128 A1 | 7/2004 | Becker et al. | | |
| 2005/0050518 A1 | 3/2005 | Adolph et al. | | |
| 2006/0179085 A1 | 8/2006 | Kaijima et al. | | |
| 2011/0010515 A1* | 1/2011 | Ranade | ............... | G06F 11/1451 |
| | | | | 718/1 |
| 2012/0310888 A1 | 12/2012 | Kuznetzov et al. | | |
| 2013/0054530 A1* | 2/2013 | Baker | ................... | G06F 16/119 |
| | | | | 707/639 |
| 2013/0111262 A1* | 5/2013 | Taylor | ................. | G06F 11/2005 |
| | | | | 714/4.11 |
| 2014/0279900 A1 | 9/2014 | Gupta et al. | | |
| 2014/0281709 A1* | 9/2014 | D'Amato | ............ | G06F 11/1469 |
| | | | | 714/19 |
| 2020/0073956 A1* | 3/2020 | Chen | ..................... | G06F 16/128 |
| 2020/0159413 A1* | 5/2020 | Seal | ........................ | G06F 3/065 |
| 2021/0044603 A1* | 2/2021 | Annen | ................... | G06N 20/00 |
| 2021/0357293 A1* | 11/2021 | Mathew | ................ | G06F 16/215 |
| 2022/0092022 A1* | 3/2022 | Agarwal | ................ | G06F 16/13 |

\* cited by examiner

CLOUD-BASED DATABASE BACKUP AND RECOVERY

CROSS REFERENCE TO RELATED APPLICATIONS

This application claims the benefit of priority of U.S. Provisional Application No. 63/123,757 filed Dec. 10, 2020. The disclosure of the above-referenced application is expressly incorporated herein by reference in its entirety.

TECHNICAL FIELD

The present disclosure generally relates to computerized systems and methods for database backup and recovery. In particular, embodiments of the present disclosure relate to systems and methods for dynamically backing up a database to a cloud service through a sequence of encrypted incremental snapshots, and for performing on-demand recovery of backup data through a pre-warm loading of data.

BACKGROUND

Data and databases can be one of the most valuable assets for a business. The information databases hold is often irreplaceable and can be critical for providing services. Data in databases may also provide important information to predict trends and to efficiently handle customer relationship management (CRM). Indeed, for many businesses data is the product and the service offered to customers. And data corruption and loss can be catastrophic for conducting operations. Thus, recovering data from unexpected incidents is very important for service availability, quality, and resilience.

To minimize effects of database failure, database administrators may backup databases through backup processes in which the operational state, architecture, and data of a database are stored in a second location or a replica. Database backups create duplicate instances or copies of a database in case the primary database crashes, is corrupted, or is lost. Database backups replicated, protect, and restore information contained in a database. For example, a backed up database may be restored to an operational state, along with its data and logs, so long the database has been adequately backed up before failure. Thus, in some situations, database administrators backup databases to comply with regulations and to maintain and ensure access to business data in case of a disaster or technical outage.

Traditionally, database backups had been made locally or on-premises. For example, a database may be replicated in local partitions of hard drives or in external devices that are isolated from the main database. But with the advent of cloud computing, databases can be backed up in servers or in cloud services. Cloud computing is now ubiquitous and companies frequently run their websites, services, and/or technology stacks in a cloud provider's domain. With services running in cloud environments databases may be backed up in servers and the cloud. However, outsourced or off-premises backups have security and reliability challenges. While cloud providers offer solutions to backup databases, cloud-based backups raise issues on data privacy, security, and availability. Sensitive data may not be backed up off-premises out of security concerns because the cloud-based backups may be exposed to a series of risks. Also, cloud-based backups may be limited to narrow bandwidths between the cloud and clients that do not provide the data availability that may be desirable for critical and time sensitive backups. For example, connectivity and bandwidth to cloud services may limit availability/speed of recovery data and/or constrain the frequency of backups.

The disclosed systems and methods for database backup and recovery address one or more problems set forth above and/or other problems in the prior art.

SUMMARY

One aspect of the present disclosure is directed to a system for database backup. The system may include a controller, a metadata database coupled to the controller, a backup tool coupled to the controller, and a plurality of nodes coupled to the backup tool and accessed through a file system. In the system, the controller may be configured to: determine a first data change in at least one of the plurality of nodes, in response to determining the first data change, freeze the file system, and after freezing the file system, generate an incremental snapshot of the at least one of the plurality of nodes (the incremental snapshot including a portion of the at least one of the plurality of nodes). The controller may also be configured to upload an encrypted copy of the incremental snapshot to a cloud storage and, after uploading the encrypted copy, update the metadata database by storing an entry associating the incremental snapshot with the at least one of the plurality of nodes and unfreezing the file system.

Another aspect of the present disclosure is directed to a computer-implemented method for database backup. The method may be performed by a computer processor. The method may include operations of: determining (by a controller coupled to a plurality of nodes coupled to a backup tool and accessed through a file system) a first data change in at least one of the plurality of nodes; in response to determining the first data change, freezing the file system; and after freezing the file system, generating an incremental snapshot of the at least one of the plurality of nodes, the incremental snapshot including a portion of the at least one of the plurality of nodes. The method may also include uploading an encrypted copy of the incremental snapshot to a cloud storage, and (after uploading the encrypted copy) updating a metadata database by storing an entry associating the incremental snapshot with the at least one of the plurality of nodes and unfreezing the file system.

Yet another aspect of the present disclosure is directed to a system for database backup. The system includes at least one processor and at least one memory device including instructions that when executed configure the at least one processor to perform operations. The operations may include: determining a first data change in at least one of a plurality of nodes; in response to determining the first data change, freezing a file system; and after freezing the file system, generating an incremental snapshot of the at least one of the plurality of nodes (the incremental snapshot including a portion of the at least one of the plurality of nodes). The operations may also include uploading an encrypted copy of the incremental snapshot to a cloud storage; after uploading the encrypted copy, updating a metadata database by storing an entry associating the incremental snapshot with the at least one of the plurality of nodes and unfreezing the file system; and receiving a recovery request including a data query. The operations may also include identifying hot data and cold data based on the data query and samples retrieved from a general log, the hot data including data files that have been accessed over a threshold number of times in a general data log, the cold data including data files that have been accessed less than the threshold number of times in the general data log; querying the metadata database to identify one or more incremental snapshots including the hot data; and pre-warming the backup tool by loading a portion of at least one of the one or more incremental snapshots. The operations may also include determining whether to load the at least one of the incremental snapshots; fetching the incremental snapshots from the cloud storage; and decrypting the incremental snapshots and storing decrypted snapshots in at least one of the plurality of nodes.

DETAILED DESCRIPTION

Figure 1A:
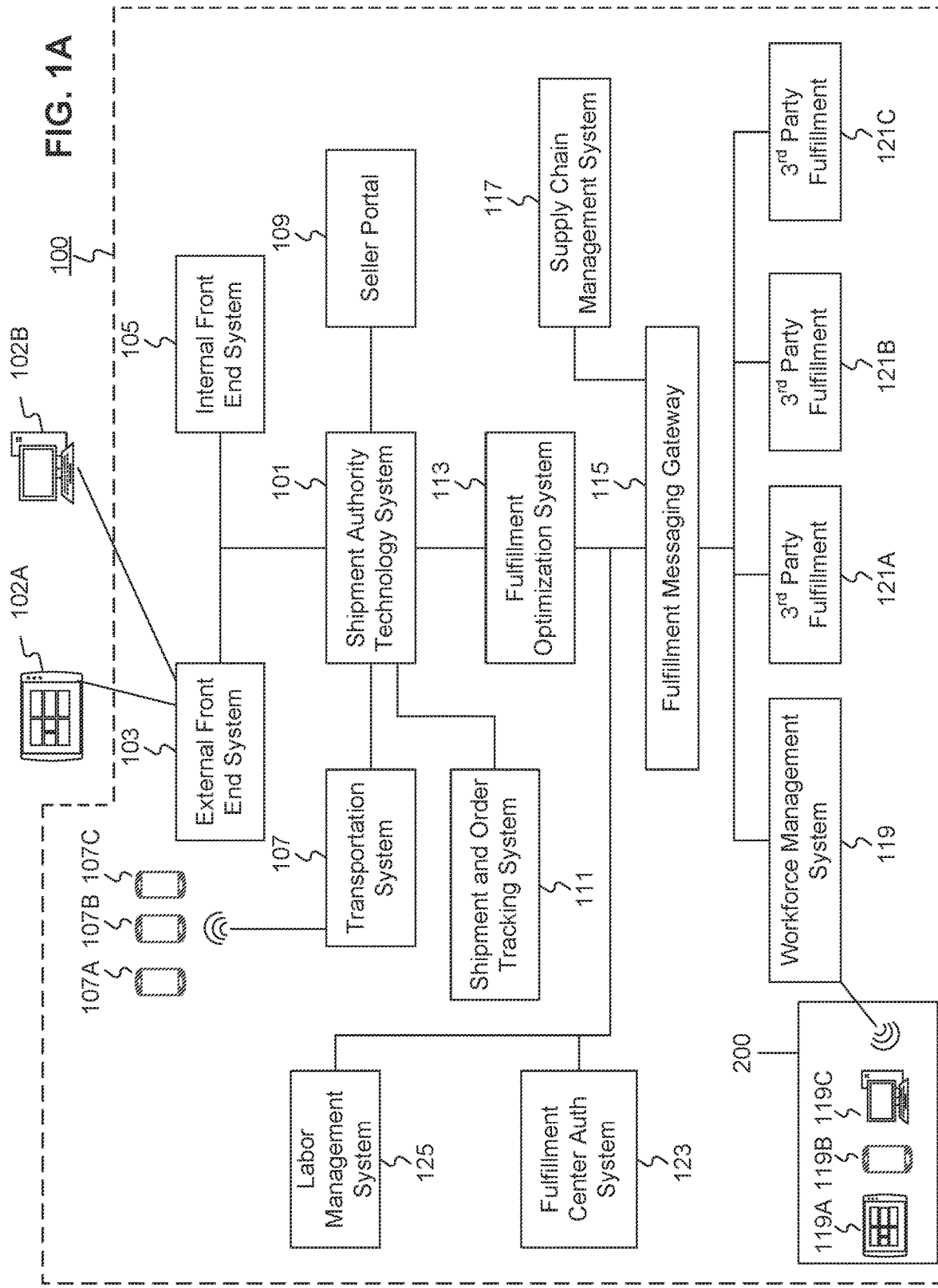
FIG. 1A is a schematic block diagram illustrating an exemplary embodiment of a network including computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. The following detailed description is not limited to the disclosed embodiments and examples.

Literals used to reference individual elements in the figures, e.g., A or B, do not specify the number of an element or the total number of elements. Instead, they are variable references that indicate a variable element number and a variable number of total elements. For example, literal B does not indicate that the element with the "B" literal is the $2^{nd}$ one. Instead, B is a variable reference that could indicate any integer number.

Embodiments of the present disclosure are directed to systems and methods for database backup and recovery in a cloud environment. Disclosed system and methods enable a more consistent and secure backing up process that includes generating sequential snapshots of databases. These snapshots can be dynamically encrypted and uploaded to cloud storage to generate a backup that is secure, fast, and occurs while the system is running (i.e., without interruption of operations). Taking sequential snapshots also provide benefits of minimizing the utilized bandwidth while performing frequent updates to the backup copies. In the disclosed systems and methods, database snapshots are incremental backups, which means that only the blocks on the device that have changed after your most recent snapshot are saved. Each snapshot contains all the information that is needed to restore modified data but avoid repetition of backups by targeting only changes in a volume, without backing up the entire volume. For example, when a database volume has 10 GB of data, the disclosed systems and methods can generate incremental snapshots of only portions of the volume that have been modified. In some embodiments, disclosed embodiments may minimize backup times and use of bandwidth to cloud services. In some embodiments, the disclosed systems and methods may also allow monitoring for selective back up that enhances system and data availability even during backup or recovery.

The disclosed systems and methods may also provide an added level of security during backup and recovery processes by encrypting the incremental snapshots before they are uploaded to the cloud service. The disclosed systems and methods may include a dynamic encryption engine that can encrypt snapshots of databases as they are being produced before uploading them to cloud storage. During recovery, the encryption engine may also decrypt backup incremental snapshots on-demand, as they are requested by the client. Through dynamic encryption and decryption, the disclosed systems and methods enable secure cloud-based database backup while also minimizing latencies caused by the encryption or decryption process of large volumes.

The disclosed systems and methods may also minimize downtime during backup operations by deploying a database architecture in which data nodes are divided into sources and replicas. Backup operations may necessitate freezing the file system and/or a portion of the database to prevent additional writes while the backing up tool captures snapshots. To minimize down time and avoid losing service availability, the disclosed systems and methods deploy an architecture with redundancy within database nodes. For example, in certain embodiments, a backup tool may flush logs to ensure that all data in memory is saved on disk, and then freeze the file system to make the file system temporarily unwritable and start making a snapshot backup. In such embodiments, the backup tool may operate on replica nodes (instead of the principal nodes) to avoid interfering with ongoing jobs. As mentioned above, during this time the incremental snapshots may be encrypted and uploaded to cloud storage as chunks, while multiple encryption engines parallelize encryption operations to minimize downtime.

Moreover, the disclosed systems and methods may also minimize downtime by avoiding generating temporary or transitory files. In some embodiments, the disclosed systems and methods may stream backup files and coordinate backup processes within disks to generate backup copies in chunks (for example, aggregated volumes of document with changes) for fast restore of the disk. In such embodiments, the incremental snapshots may be streamed for upload.

Further, the disclosed systems and methods also minimize downtime during recovery by identifying "hot" and "cold" data and pre-warming recovery volumes, buffers, or tools with the data that is likely to be accessed during a recovery period. For example, the disclosed systems and methods may include creating a new database from existing snapshots by a lazy (or on-demand) load that minimizes resources used during active recovery. In such embodiments, when a replica is created from a snapshot, the system need not wait for all the data to transfer from cloud storage to a volume accessible to the client. Accordingly, the disclosed systems and methods solve technical issues of avoiding data denials through on-demand downloads of requested data from cloud storage while continuing loading the rest of recovery data in the background and maintaining security through dynamic encryption and decryption of backed up data.

Moreover, the disclosed systems and methods result in improved performance and simpler scalability of the database operation and backup. The disclosed methods may decrease latency in database backup and recovery. The disclosed methods and systems may also increase the ability to handle queries per second (QPS). Further, the disclosed systems and methods may also enhance scalability by separating parallelizing tasks performed during backup and recovery. For example, some of the disclosed methods include parallelizing encryption and decryption tasks throughout different engines. Further, the disclosed systems and methods also include methods to rearrange connections through different services or engines to maintain uniform active, peak, and wait threat connections.

Reference will now be made to the disclosed embodiments, examples of which are illustrated in the accompanying drawings.

FIG. 1A shows a schematic block diagram of system 100 illustrating an exemplary embodiment of a system including computerized systems for communications enabling shipping, transportation, and logistics operations. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front-end system 103, an internal front-end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. SAT system 101 may also monitor data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front-end system 103 and FO system 113.

External front-end system 103, in some embodiments, may be implemented as a computer system that enables external users to interact with one or more systems in system 100. For example, in embodiments where system 100 enables the presentation of systems to enable users to place an order for an item, external front-end system 103 may be implemented as a web server that receives search requests, presents item pages, and solicits payment information. For example, external front-end system 103 may be implemented as a computer or computers running software such as the Apache HTTP Server, Microsoft Internet Information Services (IIS), NGINX, or the like. In other embodiments, external front-end system 103 may run custom web server software designed to receive and process requests from external devices (e.g., mobile device 102A or computer 102B), acquire information from databases and other data stores based on those requests, and provide responses to the received requests based on acquired information.

In some embodiments, external front-end system 103 may include one or more of a web caching system, a database, a search system, or a payment system. In one aspect, external front-end system 103 may include one or more of these systems, while in another aspect, external front-end system 103 may include interfaces (e.g., server-to-server, database-to-database, or other network connections) connected to one or more of these systems.

An illustrative set of steps, illustrated by FIGS. 1B, 1C, 1D, and 1E, will help to describe some operations of external front-end system 103. External front-end system 103 may receive information from systems or devices in system 100 for presentation and/or display. For example, external front-end system 103 may host or provide one or more web pages, including a Search Result Page (SRP) (e.g., FIG. 1B), a Single Display Page (SDP) (e.g., FIG. 1C), a Cart page (e.g., FIG. 1D), or an Order page (e.g., FIG. 1E). A user device (e.g., using mobile device 102A or computer 102B) may navigate to external front-end system 103 and request a search by entering information into a search box. External front-end system 103 may request information from one or more systems in system 100. For example, external front-end system 103 may request information from FO System 113 that satisfies the search request.

External front-end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, promised delivery date (PDD), weight, size, offers, discounts, or the like. In some embodiments, the SRP may also include delivery options, cutoff times for delivery options and/or hypermedia elements requesting user input. External front-end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front-end system 103. In response, external front-end system 103 may request information related to the selected product. For example, the information may include additional information beyond that presented for a product on the respective SRP. This could include, for example, shelf life, country of origin, weight, size, number of items in package, handling instructions, cutoff time for dawn or first time deliveries, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front-end system 103 may prepare an SDP (Single Display Page) (e.g., FIG. 1C) based on the received product information, location of the customer device, and availability of delivery options. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front-end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. Alternatively, or additionally, the user may interact with the SDP by providing instructions for delivery. The user device may transmit this request to add the product to the shopping cart to external front-end system 103.

Figure 1D:
FIG. 1D depicts a sample cart page that includes items in a virtual shopping cart along with interactive user interface elements, consistent with the disclosed embodiments.
Figure 1E:
FIG. 1E depicts a sample order page that includes items from the virtual shopping cart along with information regarding purchase and shipping, along with interactive user interface elements, consistent with the disclosed embodiments.

External front-end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding promised delivery date (PDD), a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front-end system 103. In some embodiments, the Cart page may include text box inputs, interactive icons, or recommendation messages for each product delivery.

External front-end system 103 may generate an order page (e.g., FIG. 1E) in response to receiving the request to initiate a purchase. The order page, in some embodiments, re-lists the items from the shopping cart and requests input of payment and shipping information. For example, the order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front-end system 103 may send the Order page to the user device.

The user device may enter information on the order page and click or otherwise interact with a user interface element that sends the information to external front-end system 103. From there, external front-end system 103 may send the information to different systems in system 100 to enable the creation and processing of a new order with the products in the shopping cart. In some embodiments, external front-end system 103 may be further configured to enable sellers to transmit and receive information relating to orders.

Internal front-end system 105, in some embodiments, may be implemented as a computer system that enables internal users (e.g., employees of an organization that owns, operates, or leases system 100) to interact with one or more systems in system 100. For example, in embodiments where SAT system 101 enables the presentation of systems to enable users to place an order for an item, internal front-end system 105 may be implemented as a web server that enables internal users to view diagnostic and statistical information about orders, modify item information, or review statistics relating to orders. For example, internal front-end system 105 may be implemented as a computer or computers running software such as the Apache HTTP Server, Microsoft Internet Information Services (IIS), NGINX, or the like. In other embodiments, internal front-end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front-end system 105 may include one or more of a web caching system, a database, a search system, a payment system, an analytics system, an order monitoring system, or the like. In one aspect, internal front-end system 105 may include one or more of these systems, while in another aspect, internal front-end system 105 may include interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may include devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more users (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front-end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfillment centers may be designed to store only a particular set of items (e.g., fresh produce or frozen products). FO system 113 stores this information as well as associated information (e.g., quantity, size, date of receipt, expiration date, etc.).

Fulfillment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below regarding FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front-end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
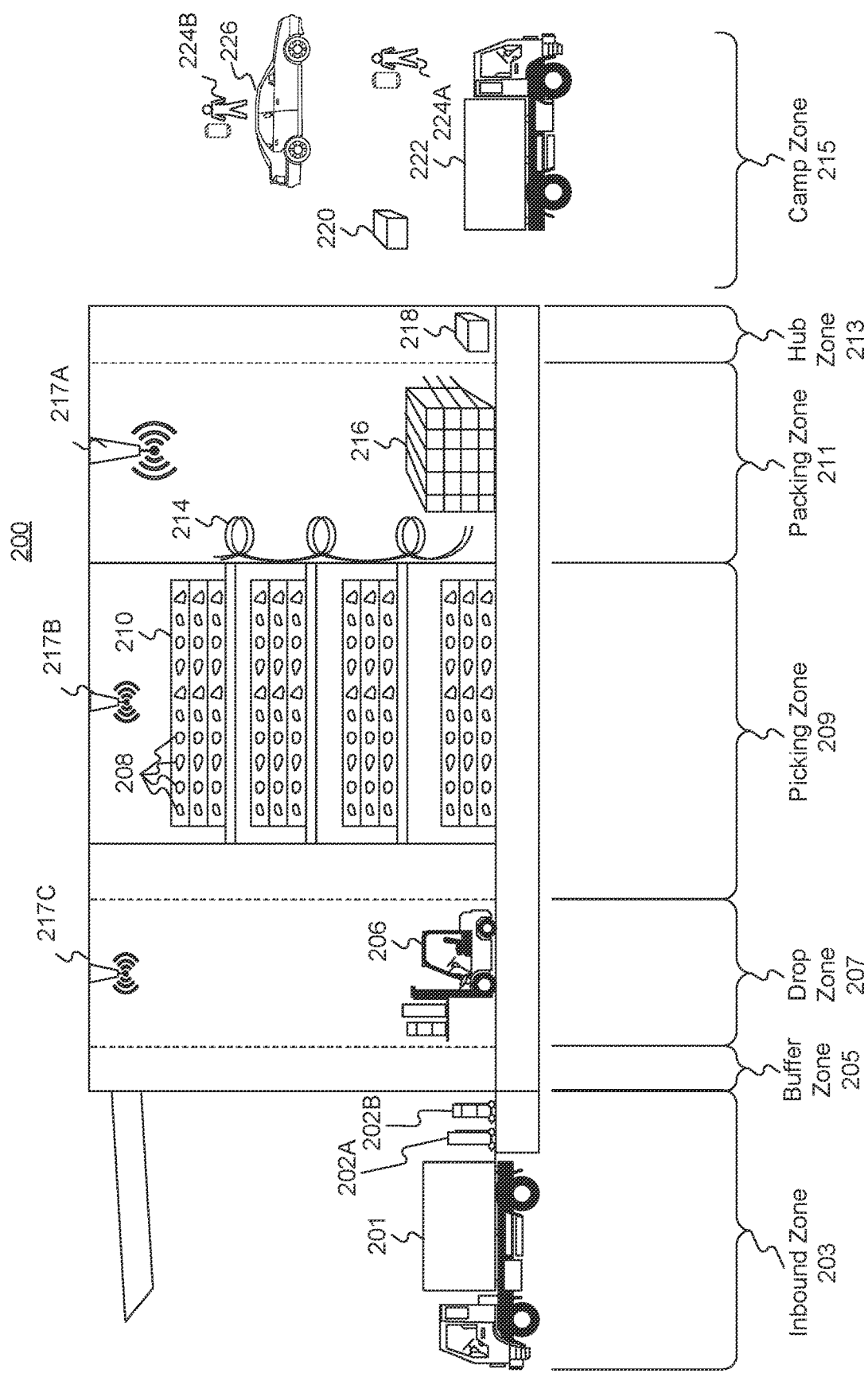
FIG. 2 is a diagrammatic illustration of an exemplary fulfillment center configured to utilize disclosed computerized systems, consistent with the disclosed embodiments.

FIG. 2 depicts a fulfillment center 200. Fulfillment center (FC) 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So, while the "zones" are depicted in FIG. 2, other divisions of zones are possible and the zones in FIG. 2 may be omitted, duplicated, and/or modified in some embodiments.

Inbound zone 203 represents an area of FC 200 where items are received from sellers who wish to sell products using system 100 (FIG. 1A). For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). Such event may update a real time location system that updates a database to specify the item has been moved into the FC. The picker may then take the item to picking zone 209 (e.g., by placing it on a cart or carrying it) and the real time location system may request the position of storage for the new item.

Picking zone 209 may be an area of FC 200 where items 208 are stored on storage units 210. In some embodiments, storage units 210 may include one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. In some embodiments, the location to stow item 202A may be determined based on predictive algorithms that attempt to maximize the availability of special delivery options, such as dawn deliveries. The device may then prompt the picker to scan a barcode at that location before stowing item 202A in that location. Alternatively, a wireless sensor or a camera coupled with image recognition, may store the location of the time. In some embodiments, the device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. In some embodiments, as further described in connection with FIG. 11, the picker may receive instructions through a placement or storing guide to stow the products. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may include, for example, determining a portion of a geographical area that the package is destined for (e.g., based on a postal code) and determining a camp zone 215 associated with the portion of the geographical area.

Camp zone 215, in some embodiments, may include one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, a delivery option, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
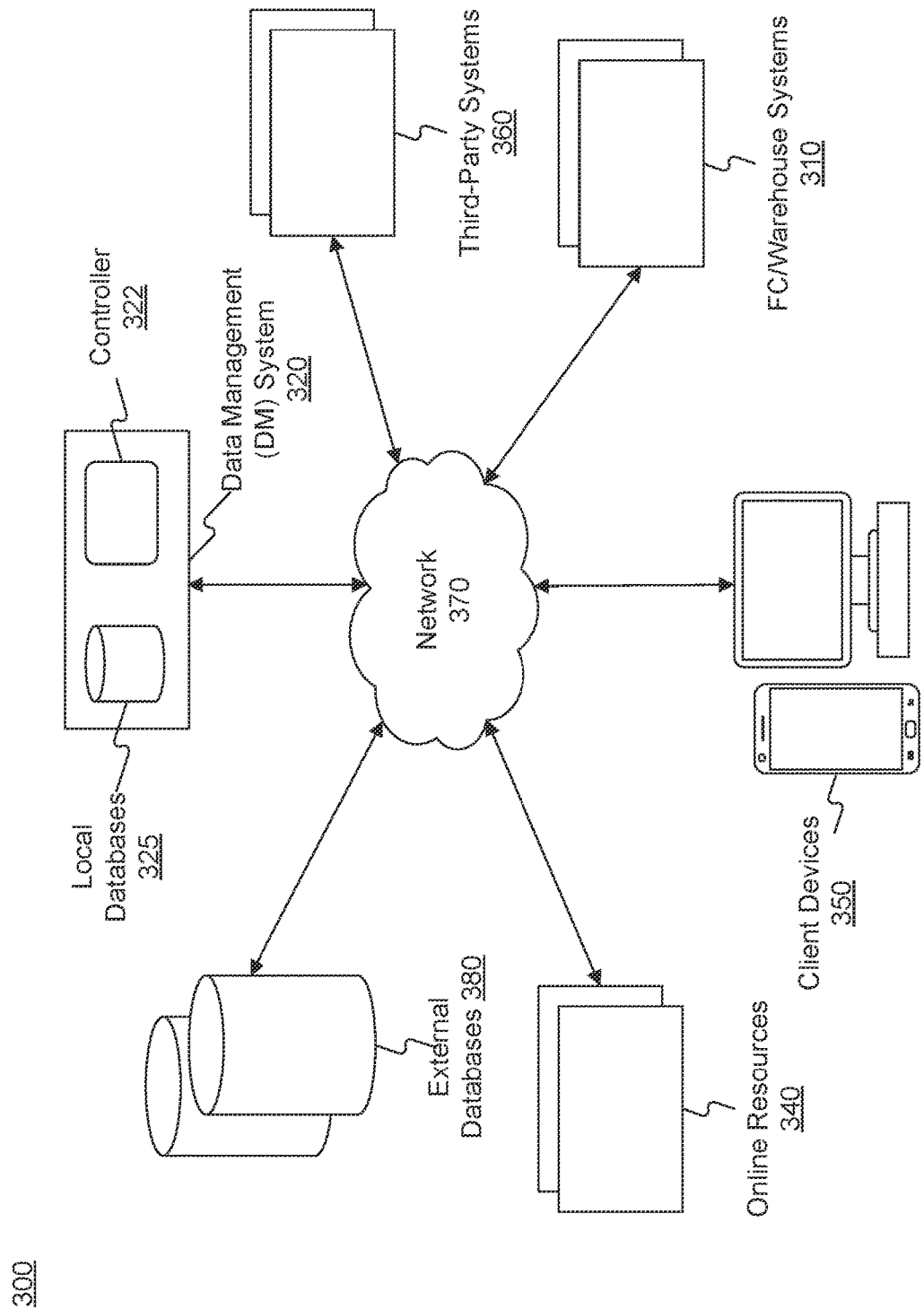
FIG. 3 is a schematic block diagram of an exemplary system, consistent with disclosed embodiments.

FIG. 3 is a block diagram of an exemplary system 300, consistent with disclosed embodiments. In system 300, a data management (DM) system 320 may include servers, computer modules, and/or data processing centers configured to manage consumer and product data, control database backup processes, and/or deploy recovery data. System 300 may include, in addition to DM system 320, online resources 340, client devices 350, third-party systems 360, FC/Warehouse systems 310, and database 380. In some embodiments, as shown in FIG. 3, components of system 300 may be connected to a network 370. However, in other embodiments components of system 300 may be connected directly with each other, without network 370. For example, databases 380 may be directly coupled to DM system 320.

In some embodiments, DM system 320 may connect to other elements of system 300 to provide a platform for accessing and manipulating data stored in databases. Thus, in some embodiments, DM system 320 may store and curate information of system 300. For example, in an e-commerce context, DM system 320 may manage and coordinate information about product available in fulfillment centers or customer preferences. For example, DM system 320 may include information that is communicated to clients through External Front End System 103 and/or the data necessary to generate the SDP of FIG. 1C. DM system 320 may also coordinate security protocols and permissions to access or modify data. In some embodiments, users that want to manipulate data of system 300 can only do so through DM system 320.

DM system 320 may include a controller 322 that may analyze communications in system 300, categorize data, and store them in a database. Further, controller 322 may also perform functions of encryption and decryption of data. For example controller 322 may implement encryption and decryption engines that may be used for encryption and decryption of database snapshots as they are uploaded to cloud services. In some embodiments, controller 322 may include engines or kernels for Advanced Encryption Standard (AES) for 128 bit, 192 bit, and/or 256 bit encryption. In some embodiments, controller 322 may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, controller 322 may be a plurality of devices coupled and configured to perform functions consistent with the disclosure. In some embodiments, controller 322 may be configurable or programmable through an input module 412 (discussed below with respect to FIG. 4).

Further, DM system 320 may include local databases 325 that store and manage certain information of system 300. For example, local databases 325 may include, for example, Oracle™ databases, Sybase™ databases, or other relational databases or non-relational databases, such as Hadoop™ sequence files, HBase™, or Cassandra™. In some embodiments, local databases 325 may include computing components (e.g., database management system, database server, etc.) configured to receive and process requests for data stored in memory devices of the database(s) and to provide data from the database(s). In other embodiments, controller 322 may control operations of local databases 325 and local databases 325 may be storage units. In some embodiments, local databases 325 may include NoSQL databases such as HBase, MongoDB™ or Cassandra™. Further, local databases 325 may include relational databases such as Oracle, MySQL and Microsoft SQL Server.

Local databases 325 may store data that may be used by other elements of system 300. For example, local databases 325 may store data that may be requested by client devices 350 or online resources 340. Data stored in local databases 325 may include any suitable data associated with delivery orders and/or deliverers that can be used to select a pricing algorithm and to determine and/or adjust payout to deliverers. Data stored in local databases 325 may also include financial information about users, user credentials, and/or user preferences. While FIG. 3 illustrates local databases 325 within data system 320, in some embodiments local databases 325 may be located separately (virtually or physically) from DM system 320. For example, in some embodiments, local databases 325 may be external storage units that can be connected or disconnected by users.

In some embodiments, DM system 320 may be implemented with one or more of the components of system 100 (FIG. 1A). For example, DM system 320 may be implemented as part of internal front-end system 103, FO system 113, SCM system 117, SAT system 101, and/or WMS 119 (FIG. 1A). In other embodiments, DM system 320 may be implemented with a database server having a client-server model for database access. In such embodiments, DM system 320 may manage information about order data, click data, and/or product data that is collected through External Front End System 103 (FIG. 1A). Also, DM system 320 may manage information for sensors, scans, and product placement for each zone in fulfillment center 200 (FIG. 2). Alternatively, or additionally, DM system 320 may be implemented as an embedded database within a specific application. For example, DM system 320 may be embedded as part of SCM 117 (FIG. 1A). In some embodiments, DM system 320 may control access to local databases 325 through a front-end/back-end assignments of tasks in which the front end runs on client devices 350—which displays requested data—while the back end runs on the server and handles tasks such as data analysis and storage.

In some embodiments, as further discussed in connection with FIG. 5, DM system 320 may be implemented with a master-slave model, where DM system 320 includes master servers, which are central and primary locations of data, and slave servers, which are synchronized backups of the master acting as proxies or replicas.

In some embodiments, DM system 320 may expose resources through application programing interfaces (APIs) that respond to query languages. APIs for DM system 320 specify filter conditions and parameters. The APIs may also provide methods for authentication and to pass or share credentials. Through APIs, DM system 320 may allow client devices 350 (or other elements of system 300) to read hits the database after accessing through known credentials. DM system 320 may respond to API request by fetching the records from the relevant tables in the database, wrap them and tag them, and return files the program as a returning parameter or sends to an address as passed in the parameters.

DM system 320 may implement data management using proprietary database applications like Oracle, DB2, Informix, and Microsoft SQL Server. Alternatively, or additionally, DM system 320 may be implemented with free software database applications including PostgreSQL; and under the GNU General Public License.

System 300 may include, besides DM system 320, online resources 340, client devices 350, third-party systems 360, FC systems 310, and databases 380. In some embodiments, as shown in FIG. 3, components of system 300 may be connected to a network 370. However, in other embodiments components of system 300 may be connected directly with each other, without network 370. For example, databases 380 may be directly coupled to DM system 320.

Online resources 340 may include one or more servers or storage services provided by an entity such as a provider of webpage hosting, networking, cloud, or backup services. In some embodiments, online resources 340 may be associated with hosting services or servers that store web pages for authentication services, Domain Name System (DNS), or landing pages. In other embodiments, online resources 340 may be associated with a cloud computing service. In yet other embodiments, online resources 340 may be associated with a messaging service, such as Apple Push Notification Service, Azure Mobile Services, or Google Cloud Messaging. In such embodiments, online resources 340 may handle the delivery of messages and notifications related to functions of the disclosed embodiments.

Moreover, online resources 340 may include redirect servers that can be configured by DM system 320 to perform tracking operations to evaluate user engagement with the databases, which may include external databases 380, local databases 325, or both. For example, online resources 340 may include cloud services for backing up data. In some embodiments, online resources 340 may be programmable by DM system 320. For example, redirect servers in online resources 340 may be programmed by DM system 320 to periodically generate queries to generate snapshots of volumes in the data base and upload them. Alternatively, or additionally, online resources 340 may be configurable for encryption, decryption, and/or authentication processes. As further discussed in connection with, for example, FIGS. 12A and 13, the disclosed systems and methods enhance security and reliability of cloud-based backups by dynamically encrypting snapshots of backups. In such embodiments, certain encryption tasks may be performed through online resources 340.

Client devices 350 may include one or more computing devices configured to perform one or more operations consistent with disclosed embodiments. For example, client devices 350 may include a desktop computer, a laptop, a server, a mobile device (e.g., tablet, smart phone, etc.), a set-top box, a gaming device, a wearable computing device, or other type of computing device. In some embodiments, client devices 350 may include the user devices 102A/102B (FIG. 1A) and be operated as part of system 100. In other embodiments, however, client devices 350 may be independent from system 100. Client devices 350 may include one or more processors configured to execute software instructions stored in memory, such as memory in client devices 350, to perform operations to implement the functions described below. For example, client devices 350 may access information in local databases 325 through DM system 320. Further, client devices 350 may be configured to perform operations according to instructions transmitted by DM system 320. Further, client devices 350 may be configured for wired and/or wireless communications and may include software that when executed by a processor performs internet-related communication (e.g., TCP/IP) and content display processes. For instance, client devices 350 may execute browser software that generates and displays interfaces with product information. Thus, client devices 350 may execute applications that allow client devices 350 to communicate with components over network 370 and display content in interfaces via display devices included in client devices 350.

The disclosed embodiments are not limited to any particular configuration of client devices 350. For instance, a client device 350 may be a mobile device that stores and executes mobile applications to perform operations that provide functions offered by DM system 320 and/or online resources 340.

Databases 380 may include one or more computing devices configured with appropriate software to perform operations consistent with maintaining backups for information in DM system 320 or to provide data necessary for the operation of DM system 320. Databases 380 may include, for example, Oracle™ databases, Sybase™ databases, or other relational databases or non-relational databases, such as Hadoop™ sequence files, HBase™, or Cassandra™. Databases 380 may include computing components (e.g., database management system, database server, etc.) configured to receive and process requests for data stored in memory devices of the database(s) and to provide data from the database(s).

While databases 380 are shown separately, in some embodiments databases 380 may be included in, or otherwise related to, DM system 320 or online resources 340. For example, databases 380 may be implemented as local databases 325 in certain embodiments. In some embodiments, databases 380 may store information used during backups or recovery processes. For example, databases 380 may include logs of data accessed in a period that may allow controller 322 to identify "hot" and "cold" data. Databases 380 may also include keys for encryption and/or decryption of snapshots. Further, in some embodiments databases 380 may itself include the snapshots and/or replicas for the volumes in local databases 325. For example, databases 380 may be setup as an online backup accessed through a client program.

Third-party systems 360 may include one or more elements of system 100. For example, third-party systems 360 may include 3PL systems 121A-121C (FIG. 1). Additionally, or alternatively, third-party systems 360 may include one or more servers or storage services provided by an entity related to DM system 320, such as a provider of services or a fulfillment center. Third-party systems 360 may also be connected to system 300 via network 370, but in other embodiments third-party systems 360 may include direct connections with some elements of system 300. For example, to minimize delays or network congestion, third-party systems 360 may be connected in a private network with DM system 320. Further, third-party systems 360 may be configured to provide and/or request information from DM system 320, or other elements of system 300. In some embodiments, while third-party systems 360 may also be coupled to network 370, they may not be clients of DM system 320. Instead, third-party systems 360 may include systems that include information of users or clients of DM system 320. For example, third-party systems 360 may include servers of delivery contractors, which may be used by DM system 320 when a product delivery involves a third-party contractor. In such embodiments, DM system 320 may be configured to generate backups of data accessible from third-party systems 360.

FC/Warehouse systems 310 may include sensors and processors for determining and/or storing the location of products within an FC or warehouse and periodically update databases (such as local databases 325). For example, FC/Warehouse systems 310 may include sensors 217A-217C (FIG. 2). Alternatively, or additionally, FC/Warehouse systems 310 may include cameras that capture images of shelves and use image recognition methods to identify products and determine the position of products in the FC. Further, FC/Warehouse systems 310 may be coupled to scan devices and track the positioning of products in an FC by monitoring scanning events of products. Moreover, FC/Warehouse systems 310 may be in communication with DM system 320 to provide information that facilitates estimating available inventory. In some embodiments, FC/Warehouse systems 310 may be configured to provide periodic updates of available inventory to DM system 320. For example, FC/Warehouse systems 310 may be configured to send available inventory to DM system 320 at the end of every day.

Network 370 may be any type of network configured to provide communications between components of system 300. For example, network 370 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 300. In some embodiment network 370 may be wired, wireless, or a combination. In other embodiments, one or more components of system 300 may communicate directly through a dedicated communication link(s). In yet other embodiments, network 370 may include multiple networks, organizing for example a network or networks.

It is to be understood that the configuration and boundaries of the functional building blocks of system 300 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Figure 4:
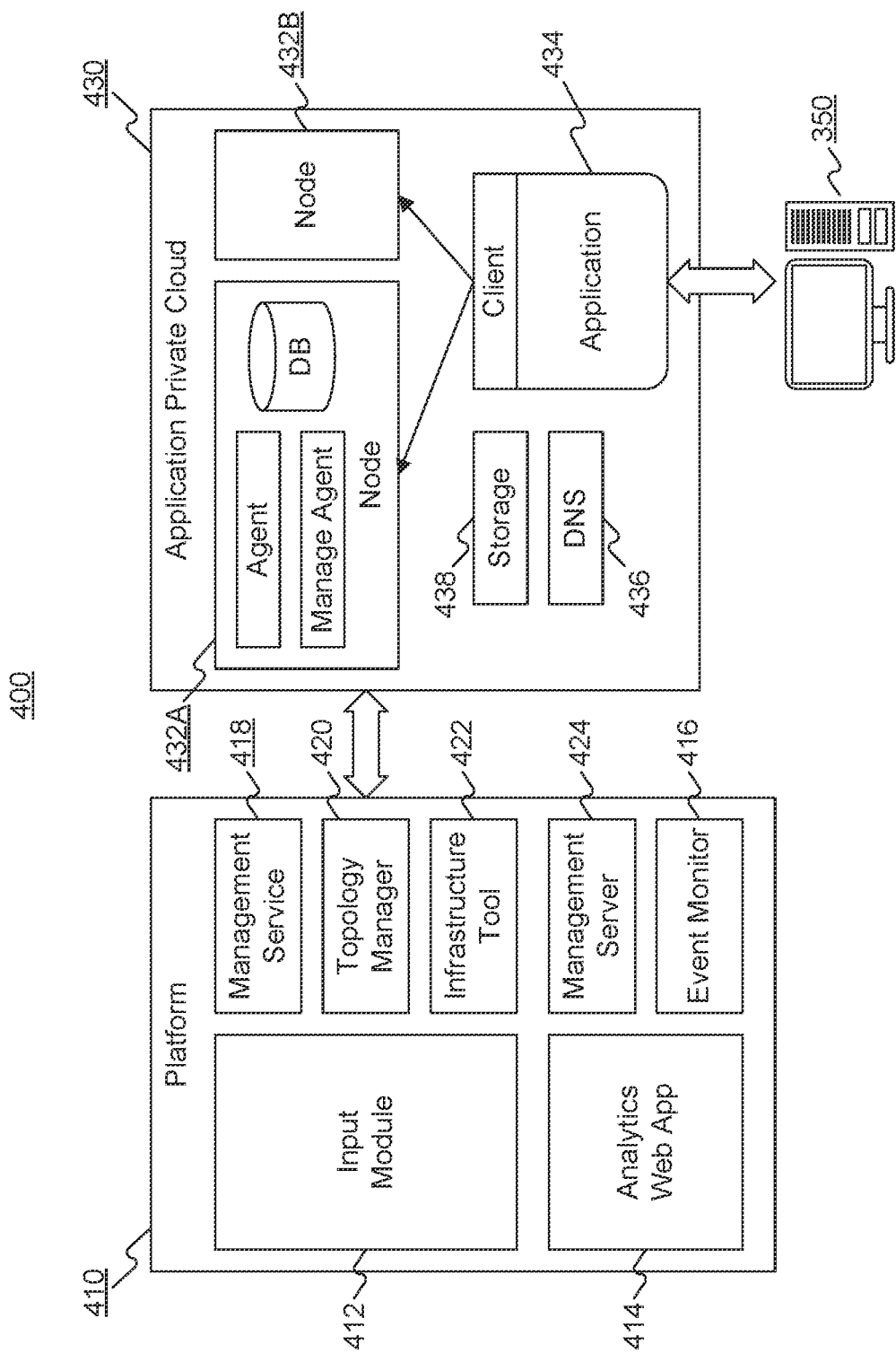
FIG. 4 is a block diagram of an exemplary cloud-based database, consistent with disclosed embodiments.

FIG. 4 is a block diagram of an exemplary cloud-based database system 400, consistent with disclosed embodiments. Database system 400 may include a platform 410 and an application private cloud 430. As shown in FIG. 4, platform 410 and an application private cloud 430 may be coupled and exchanged data. Further, application private cloud 430 may be connected to one of client devices 350.

Database system 400 allows the deployment of a cloud-based backup system in which the cloud is implemented as a private cloud. To minimize security concerns and avoid accessibility issues, while maintaining benefits of a cloud-based backup, in some embodiments, database system 400 operates through application private cloud 430 to control and generate the backups. In some embodiments, database system 400 may be implemented by DM system 320. DM system 320 may implement one or more components of database system 400. For example, controller 322 may implement platform 410 and/or local databases 325 may implement application private cloud 430. In other embodiments, database system 400 may be independent from DM system 320.

Platform 410 may include an input module 412. Input module 412 may receive user information to operate on data in database nodes. Input module 412 may be accessible to database or system administrators that can, for example, execute backup processes or request recovery of a specific file. In some embodiments, input module 412 may be an application running on a local server. Input module 412 may also have the structure of a menu-based interfaces for web clients or browsing in which a user is presented a list of options that lead the user through the formation of a request. Alternatively, or additionally, input module 412 may be structured as a form-based interfaces—in which options for configuration of the system (such as DM system 320) is displayed through one or more forms to each user. In such embodiments, users can fill out all of the form entries to insert a new data, or they can fill out only certain entries. Furthermore, in some embodiments input module 412 may be implemented as a graphical user interface that displays a schema to the user in diagrammatic form and the user then can specify a query by manipulating the diagram. Unlike GUIs for customers, the GUI in input module 412 may be specialized for performing database tasks such as executing backup processes and/or setting up backup schedules. Alternatively, or additionally, input module 412 may be implemented through natural language interfaces that accept requests written in English or some other language and attempt to understand them. In such embodiments, input module 412 may generate a high-level query corresponding to the natural language and submits it to other components of platform 410. Moreover, in certain embodiments input module 412 may be formed as database administrator (DBA) interface including privileged commands that can be used only by the database administrator staff. These include commands for creating accounts, setting system parameters, granting account authorization, changing a schema, reorganizing the storage structures of a databases.

Platform 410 may also include an analytics web app 414. Analytics web app 414 may include data analytics and reporting tools that help database managers to identify trends and or adjust configurations. Analytics web app 414 may include real-time web information on statistical data of DM system 320. In some embodiments, analytics web app 414 may connect with systems outside of database system 400 to transmit or collect data to analyze the data usage and operation. As further discussed in connection with FIGS. 17A-17B, in some embodiments database system 400 (or DM system 320) may collect and analyze information of the performance of the database and the backing up processes. In such embodiments, the analytics web app 414 may collect database data to generate plots and reports. For example, analytics web app 414 may collect information about number of queries, latency, number of snapshots, and transfer rates to the application private cloud 430. As further described in connection with FIG. 12B, analytics web app 414 may also perform predictive tasks for the identification of hot data.

Platform 410 may also include additional components for the control and monitoring of database information and its operation. Specifically, in certain embodiments platform 410 may include a management service 418, a topology manager 420, an infrastructure tool 422, a management server 424, and an event monitor 416. Management service 418, topology manager 420, an infrastructure tool 422, management server 424, and event monitor 416 may be implemented with one or more processors in platform 410. Alternatively, or additionally, these components of platform 410 may be independent devices that are specifically configured for the operations described below.

Management service 418 may include applications that enable a database administrator to schedule jobs (like back up processes) or communicate with other services in application private cloud 430. Further, management service 418 may also provide options for encryption and decryption of snapshots, configuration of snapshot templates, and/or the definitions of configurations for pre-loading data during recovery stages.

Topology manager 420 may store the topology data of databases, such as local databases 325. In some embodiments, topology manager 420 may perform periodic discovery requests to identify topology data that may be separately stored in a topology database or within the topology manger 420. Topology manager 420 may be coupled to other elements of database system 400 (including application private cloud 430) and in some embodiments it can be queried using SQL. In some embodiments, topology manager 420 generates discovery requests at initializations and/or when asked through the input module 412 to create the topology. In certain embodiments, topology manager 420 may store metadata that correlates different snapshots at different time periods and/or correlates snapshots with locations in the primary database. For example, in some embodiments topology manager 420 may store pointers or sequence files that associate a first snapshot with later snapshots of the database backup. As further discussed in connection with FIG. 11, incremental snapshots may reference previous snapshots to show concatenated changes while avoiding backing up unchanged data. As discussed in connection with FIG. 11, the reference between snapshot may be embedded in the snapshot itself. In some embodiments, however, the reference between snapshots may be stored in other systems or databases. In such embodiments, topology manager 420 may store the reference between snapshots. Further, alternatively or additionally, topology manager 420 may be implemented as a metadata database that associates snapshots with nodes in a primary database. Thus, during recovery, topology manger 420 may provide information to DM system 320 to identify the snapshots requested by users.

Infrastructure tool 422 may include software and hardware configuring tools under various environments for managing Apache Hive, CUBRID, MariaDB, MySQL, SQLite, MSSQL, PostgreSQL and MongoDB databases, among others. infrastructure tool may allow system administrators to handle and transition database operations with web-applications. Infrastructure tool 422 may unify multiple services in database system 400 and perform connections and interfaces to allow an end-to-end monitoring or operation over the technology stack used for database management. Infrastructure tool 422 may also integrate with outsourced services. For example, infrastructure tool 422 may employ machine-learning-based algorithms to automatically correlate application, infrastructure and network performance data, allowing users to find causes of emerging issues in database system 400.

In some embodiments, management server 424 may be a server that is coupled to the processor or server implementing platform 410. In other embodiments, management server 424 may be part of platform 410 and be executed as an application, as a virtual machine, or as a devoted resource. Management server 424 may perform an integrated environment for managing information in databases systems 400. For example, management server 424 may be in communication with topology manager 420 and infrastructure tool 422 to configure the information flow. Management server 424 may also provide computing resources for analysis of data. For example, management server 424 may implement any analytics requests or data from analytics web app 414 or to execute commands received through input module 412. Further, management server 424 may provide tools to configure, monitor, and administer instances of database and/or nodes in application private cloud 430. In some embodiments, management server 424 may also deploy, monitor, and upgrade the data-tier components used by applications in database system 400. Management server 424 may also build queries and scripts in for elements of database system 400.

Event monitor 416 includes software or hardware configured to detect events on the database. Events detected by event monitor 416 include changes in the database, write operations, read operations, data collections, queries, exclusions, and/or errors. Event monitor 416 also describes different data collected for different events, as well as when the monitoring data is collected. As further discussed in connection with FIG. 13, DM system 320 may initiate snapshot generations triggered by changes in the database. In such embodiments, event monitor 416 may track file system in the database to identify changes and generate the triggering events to generate one or more snapshots and or identify changes in the forms. Moreover, event monitor 416 may have visibility into database transactions, events, and specific database queries and responses—including who is accessing your data. In some embodiments, event monitor 416 may be configured to execute predefined rules and reports and privacy-friendly logging features to facilitate compliance with privacy and security requirements.

As discussed above, platform 410 may be connected with application private cloud 430, which may include one or more nodes 432, a DNS 436, a storage 438, and a client application 434. FIG. 4 only shows two of nodes 432, node 432A and node 432B. However, additional nodes may be present in application private cloud 430. FIG. 4 also shows node 432A being different as node 432B (with node 432A including an agent, a management agent, and a database). However, node 432B may include the same elements as node 432A. And additional nodes in application private cloud (e.g., a node 432Z, not shown) may include the same features and functionality of the node 432A.

As shown in FIG. 4, nodes 432 may include an agent, a management agent, and a database. The agent may be implemented as a lightweight process that controls communications between server instances, including the machine that hosts the Domain Administration Server (DAS), in FIG. 4 the application privacy could 430. The node agent may be configured to start, stop, create, and delete server instances as instructed by the Domain Administration Server associated with the respective node. The node agent may also restart failed server instances, handle request to view data in the node, provide log files, and synchronize each server instance's local configuration repository with the Domain Administration Server's central repository. Nodes 432 may also include a management agent that configure connectors and monitor node activity. The management agent may enable tailoring of log feeds and file systems. to view event logs vital to maintaining the health of the network. The management agent may also include log data directly for normalization and processing, such as firewalls, switches, and routers. Management agent may include a list of both agent and non-agent nodes, and select multiple nodes to conduct bulk operations, such as deleting nodes, upgrading agent nodes, and starting File Integrity Monitoring (FIM) on agent nodes. The database within nodes 432 includes data of DM system 320 (FIG. 3). For example, in certain embodiments nodes 432 may store data of local databases 325 (FIG. 3).

Client application 434 may be implemented with hardware and/or software and configured to interface with client devices 350 (FIG. 3). Further, client application 434 may enable access to information from database system 400 to outside systems and devices. For example, client application 434 may handle authentication tasks and response to API requests. Further, client application 434 may be configured to control access to non-browser-based applications. Client application 434 may also communicate with other elements of database system 400 by, for example, reporting events to event monitor 416. Further, client application 434 may format and tag data from nodes 432 for delivery in response to client requests.

Storage 438 may include software and/or hardware storing information used by the application private cloud 430. Storage 438 may include memory devices that store instructions that configure elements of application private cloud 430 to perform operations described below in connection with FIGS. 13-16. Additionally, or alternatively, storage 438 may store replicated data from nodes 432. For example, in certain embodiments storage 438 may act as cache for information in nodes 432. Further, storage 438 may store data during warning and/or pre-warming operations. As further discussed in connection with FIG. 14, during recovery operations DM system 320 may perform a pre-warming operation that expedites recovery and/or minimizes resources used for hot data. In such embodiments, storage 438 may store the "hot" data. Additionally, or alternatively, storage 438 may also be employed as a buffering storage that stores data that is not immediately required. For example, storage 438 may store the "cold" data while "hot" data is being processed. Putting aside "cold" data during the recovery operation may liberate resources during recovery to expedite the process or enable more targeted queries.

Doman Name System (DNS) 436 may include software and/or hardware containing data structures to resolve addresses that are queried from the application private cloud 430. For example, DNS 436 may perform operations for address resolution. Additionally, or alternative DNS 436 may perform de duplication and filtering (through both white listing and black listing). Moreover, DNS 436 may perform operations for forwarding content and performing DHCP (Dynamic Host Configuration Protocol).

Like for system 300, it is to be understood that the configuration and boundaries of the functional building blocks of system 400 have been defined herein for the convenience of the description. Alternative boundaries can be defined so long as the specified functions and relationships thereof are appropriately performed. Alternatives (including equivalents, extensions, variations, deviations, etc., of those described herein) will be apparent. Such alternatives fall within the scope of the disclosed embodiments.

Figure 5:
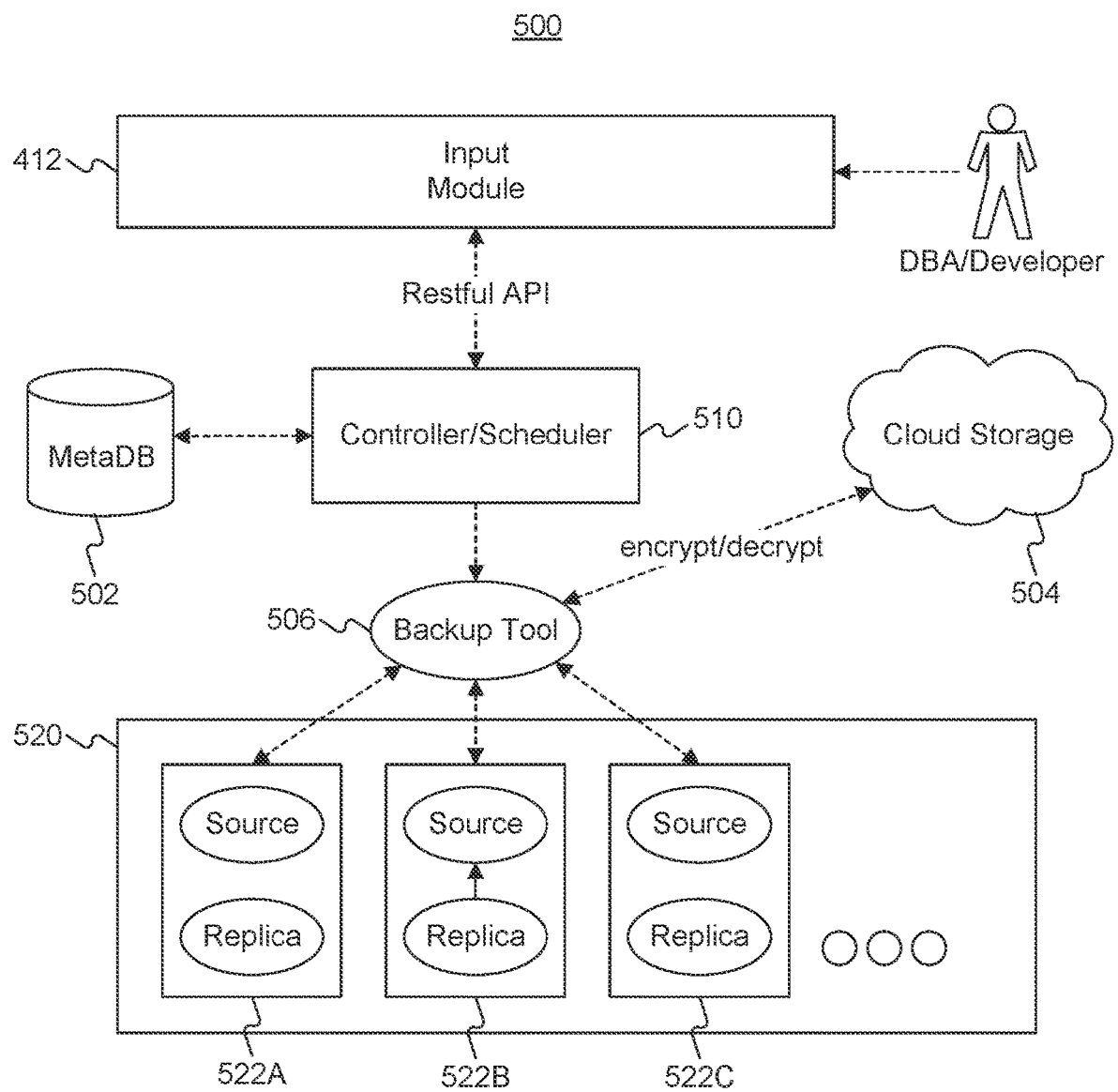
FIG. 5 is a block diagram of an exemplary database backing up system, consistent with disclosed embodiments.

FIG. 5 is a block diagram of an exemplary database backing up system 500, consistent with disclosed embodiments. In backing up system 500, input module 412 may be coupled with a controller/scheduler 510, which may be connected to a meta database (meta DB) 502 and a backup tool 506. The backup tool 506 may be configured to communicate to cloud storage 504 (e.g., through one or more APIs) and the backup tool may be configured to connect with a database 520. As shown in FIG. 5, backup tool 506 may be connected directly to nodes 522 within database 520. Further, as shown in FIG. 5, nodes 522 may each include source and replica storage. This configuration allows to maintain data continuity even during backup processes by, for example, allowing backup tool 506 to use the replica storage of nodes 522 for backup while allowing manipulation of source storage by users, thus avoiding any service interruption. Further, in certain embodiments, node 522 is equipped with an internal backup tool. For example, one or more of nodes 522 may be configured as backup nodes that have internal backup tools that can perform operations in parallel.

In some embodiments, system 500 may be implemented with or by elements of system 300. For example, system 500 may be contained in DM system 320. Further, local databases 324 may implement database 520 and controller 322 may implement the controller/scheduler 510. This is only an example and alternative implementations are possible. For example, external databases may implement database 520 and DM system 320 may implement backup tool 506, controller/scheduler 510, and/or meta DB 502. Further DM system 320 may implement all components of system 500 in certain embodiments. Similarly, system 400 may implement one or more of the components of system 500. For example, management service 418 may implement controller/scheduler 510 while nodes 432 may implement nodes 522, among other implementations.

Meta DB 502 may store metadata that is captured during backing up processes and that may be used during recovery operations. For example, meta DB 502 may store metadata that correlates incremental snapshots at different time periods and/or correlates snapshots with locations with one or more nodes 522. In some embodiments, meta DB may include a plurality of indices of references associating two or more incremental snapshots including the incremental snapshot. For example, in some embodiments meta DB 502 may store pointers or sequence files that associate an incremental snapshots (e.g., generated by backup tool 506) with other snapshots of the database backup. Meta DB 502 may also have information that correlates files stored in cloud storage 504 to facilitate lazy recovery (in which files are recovered as they are requested by users). Moreover, in certain embodiments, meta DB 502 may include logs of access through controller/scheduler 510 that facilitate analysis to identify hot and cold data. As further discussed in connection with FIG. 11, incremental snapshots may reference previous snapshots to show concatenated changes while avoiding backing up unchanged data. In such embodiments, meta DB 502 may include metadata information that correlates different snapshots in a timeline. For example, meta DB 502 may store references between snapshots. Further, alternatively or additionally, meta DB 502 may associate snapshots with nodes 522. Thus, during recovery, meta DB 502 may provide information to controller/scheduler 510 or backup tool 506 to identify the snapshots requested by users.

Cloud storage 504 may include any of a hosted object storage service, file storage, and block storage. Cloud storage may include object storage services, object storage software, object storage systems, and/or distributed storage. In some embodiments, storage may be supported with a network attached storage (NAS) server, to coordinate repositories, development environments, media stores, or directories. In some embodiments, cloud storage 504 may be off-premises. In other embodiments, cloud storage 504 may be implemented locally with dedicated servers. Further, in some embodiments, cloud storage 504 may be isolated through virtualization to dedicate an enclaved system for the recovery files to enhance security and promote availability, solving issues in prior systems.

Backup tool 506 may include software and/or hardware to perform backup and recovery operations. In some embodiments, backup tool 506 may be configurable to create supplementary copies of files in database 520 and/or nodes 522. Backup tool 506 may also be configured to perform recovery processes by, for example, replenishing database 520 with supplementary copies to restore the original contents in the event of data loss. Backup tool 506 may also perform certain operations on files during backup or recovery. For example, backup tool 506 may compress and split backup data into separate parts for storage on smaller, categorize files and assign folders or directories, create backup schedules, or offer transaction mechanisms for critical processes to guarantee backup integrity. Further, backup tool 506 may perform on-the-fly encryption and decryption on backup and/or recovery files. For example, backup tool 506 may offer cryptography features and automate the process by having triggering instructions when backup tool 506 access information (either from nodes 522 or cloud storage 504). In such embodiments, backup tool 506 may perform Live Encryption, Transparent Encryption, and/or Real-time Encryption. Thus, in certain embodiments, backup tool 506 encrypts and decrypts the incremental snapshots. In such embodiments, backup tool 506 may also generate the incremental snapshots from replica nodes of the plurality of nodes.

Controller/scheduler 510 may include one or more processors that perform or coordinate operations in system 500. In some embodiments, controller/scheduler 510 may be implemented as a server, a virtual machine, or a standalone computing processor. In some embodiments, controller/scheduler 510 may be implemented through one or more of elements in FIG. 1A. For example, controller/scheduler 510 may be implemented through SAT system 101, FO system 113, and/or fulfilment center auth system 123 (FIG. 1A). Further, controller/scheduler 510 may control backup processes to ensure data consistency for the data stored database 520. In such embodiments, controller/scheduler 510 may maintain data hierarchy that reflects the current state of the distributed filesystem. During operation, controller/scheduler 510 may receive data from a client store it, update meta DB 502, schedule backup operations, and generate incremental snapshot for the new data. Further, controller/scheduler 510 may perform operations during recovery like configuring backup tool 506 to fetch data from cloud storage 504. Further, controller/scheduler 510 may be configured to handle requests from input module 412. For example, controller/scheduler 510 may expose elements of system 500 to input module 412 through a RESTful API.

In some embodiments, controller/scheduler 510 may also perform functions of encryption and decryption of data. For example, controller/scheduler 510 may implement encryption and decryption engines that may be used for encryption and decryption of database snapshots as they are uploaded to cloud services. Further, controller/scheduler 510 may be configured to implement operations described in connection with FIGS. 11-16. Further controller/scheduler 510 may be configurable to generate GUIs, like those discuss in connection with FIGS. 17A-17B.

In some embodiments, controller/scheduler 510 and backup tool 506 may be implemented as a single unit that coordinates the different tasks in system 500. In other embodiments, controller/scheduler 510 and backup tool 506 may be a plurality of devices coupled and configured to perform functions consistent with the disclosure.

Arrows shown in FIG. 5 show connection or coupling between different element of system 500. However, the arrows may indicate a direct connection (e.g., dedicated connection between controller/scheduler 510 and metaDB 502) or also indirect connections for communication (e.g., an indirect connection between backup tool 506 and cloud storage 504).

Figure 6:
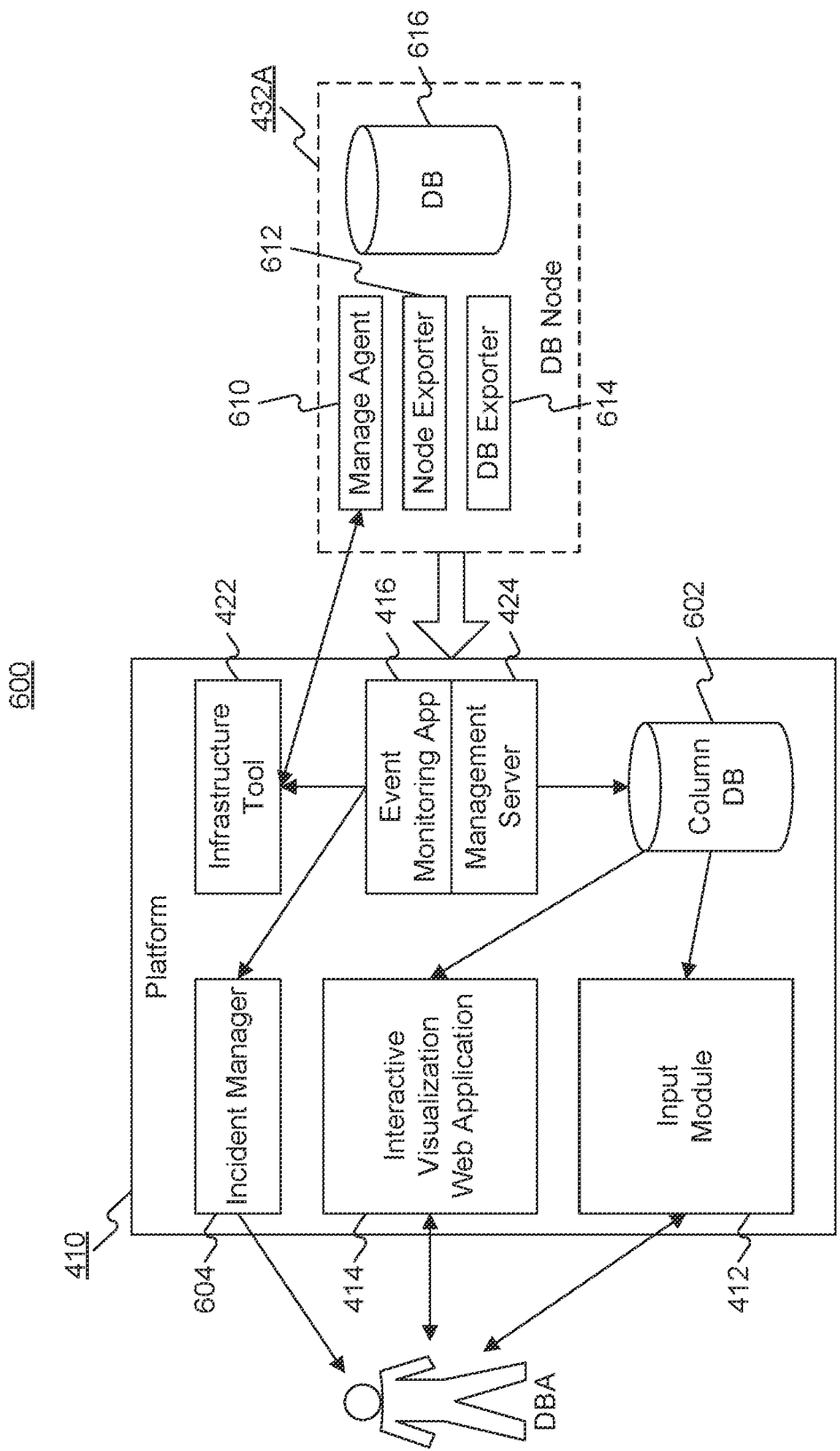
FIG. 6 is a block diagram of an exemplary database query system, consistent with disclosed embodiments.

FIG. 6 is a block diagram of an exemplary database query system 600, consistent with disclosed embodiments. FIG. 6 shows platform 410 with the analytics web app 414, infrastructure tool 422, event monitor 416, and management server 424 (FIG. 4). FIG. 6 also shows platform 410 including input module 412. In addition, platform 410 in system 600 may include an incident manager 604 and a column database (column DB) 602. In addition to platform 410, system 600 includes nodes 432 (FIG. 4). FIG. 6 shows additional elements within nodes 432 including a management agent 610, a node exporter 612, a DB exporter 614, and a local database 616.

As shown in FIG. 6, the components of system 600 may have different connections or couplings with each other. The arrows show in FIG. 6 may indicate direct connections (e.g., dedicated connections) or indirect connections (e.g., through TCP/IP).

Incident manager 604 may include hardware or software for the detection and monitoring of incidents during a recovery process. Incident manager 604 may detect and log incidents like unavailable files or corrupted files during recovery. Incident manager 604 may also generate reports of incidents and/or generate alerts that can be transmitted to users. For example, incident manager 604 may receive error notifications and reproduce them to one or more client devices 350 (FIG. 3).

In some embodiments, column DB 602 may include a database storing information of platform 410. For example, column DB 602 may store incremental snapshot information of queries, recovered snapshots, recovered nodes, timestamps, and/or log incidents (like those handled by incident manager 604). Column DB 602 may also include stores data tables by column and be configured to directly respond to queries from input module 412. In some embodiments, column DB 602 may implement meta DB 502 and store metadata information of recovered snapshots as they are transmitted to principal databases. In some embodiments, column DB 602 may store compressed information.

As shown in FIG. 6, node 432A (and nodes 432 in general) may include a database (DB) 616. As discussed in connection with FIG. 5, DB 616 may be partitioned in a replica and source. DB 616 may store information about customers or products. In some embodiments, DB 616 may be part of system 100. For example, DB 616 may be part of seller portal 109. or SAT system 101. Further, DB 616 may be a physical storage device or a virtual storage device. As shown in FIG. 6, nodes 432 may also include a manage agent 610. Manager agent 610 may be configured to provide information of a respective one of node 432 status of agent service, driver service, configuration sync and agent properties. As shown in FIG. 6, in some embodiments manage agents of nodes 432 may be directly coupled to infrastructure tool 422. In such embodiments, a direct communication between manage agent 610 and infrastructure tool 422 may enable faster identification of hot and cold data for within each node. In some embodiments, manage agent 610 can be installed/uninstalled and started/stopped through infrastructure tool 422.

Nodes 432 may also include a node exporter 612 which may handle communications between nodes 432 and platform 410. In some embodiments, node exporter 612 may include a static binary that records real-time metrics in a time series database (allowing for high dimensionality) built using a HTTP pull model, with flexible queries and real-time alerting. In some embodiments, node exporter 612 may monitor time series of incremental snapshots that may be built through a pull model. In such embodiments, platform 410 or a controller (such as controller 322) may provide a specific querying frequency. Nodes 432 may also include a DB exporter 614 which may be configured as a pump tool to export data during recovery operations and to communicate to platform 410. DB exporter 614 may enable management server 424 to request information and export or migrate data to new or existing tables, new or existing table in another database, or files. In some embodiments, DB exporter 614 may perform compatibility operations by, for example, exporting to HTML, XLSX, PDF, and RTF or normalizing the format of files that is transmitted to platform 410 during recovery operations.

In system 600, management server 424 may request data from nodes 432 and node exporter 612 and DB exporter 614. For example, management server 424 may collect data during query operations and collect the data before distributing to analytics web app 414 (which may provide some visualization GUIs to users, as further discussed in connection with FIGS. 17A-17B). Management server 424 may also collect and sort queries received through input module 412. Further, infrastructure tool 422 may monitor storage metrics while incident manager 604 monitors incidents, produces incident alerts, and/or generates logs. In such embodiments, column DB 602 may store queries. Alternatively, or additionally, column DB 602 may store incidents, resolved requests, and database metrics.

Figure 7:
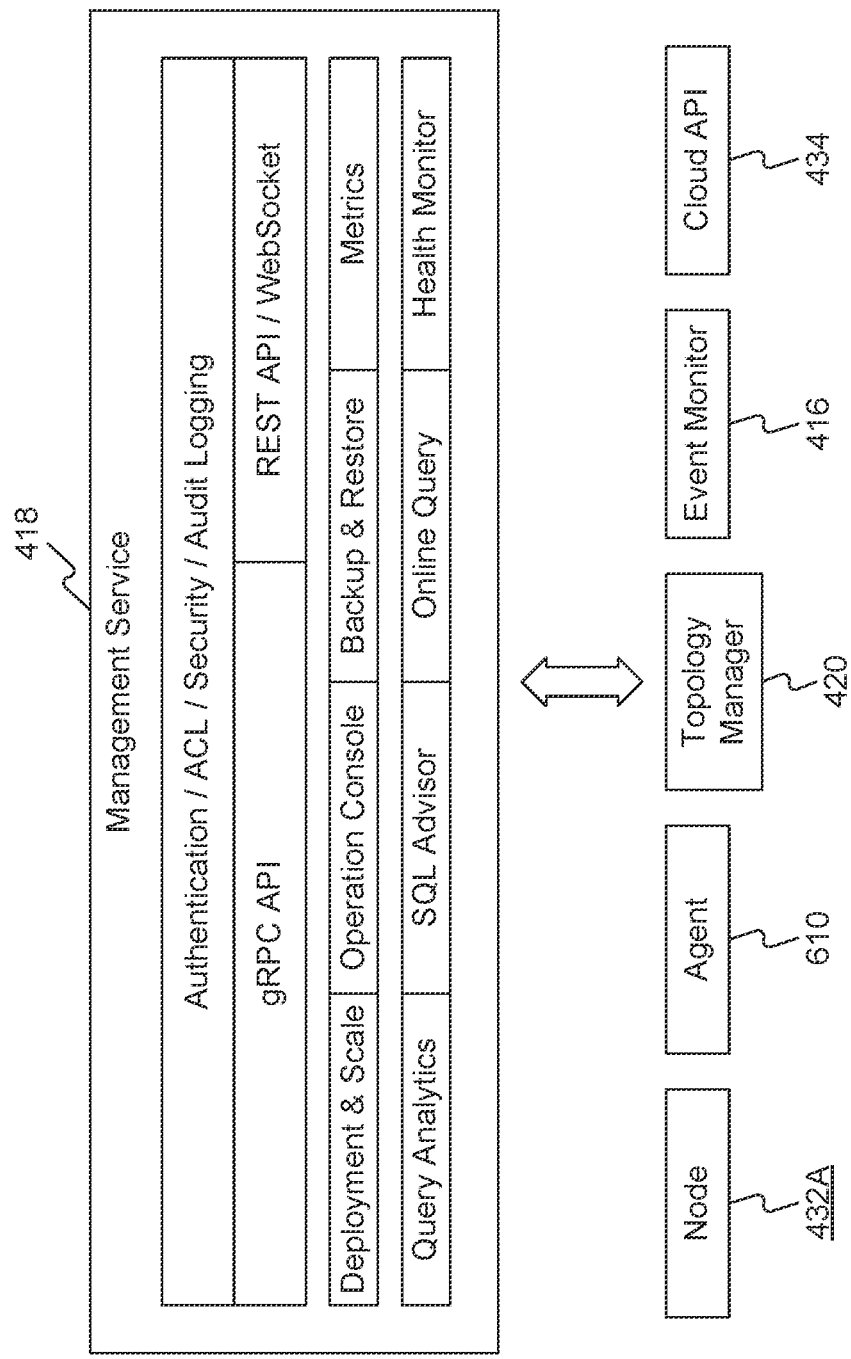
FIG. 7 is a block diagram of service layers and of a cloud-based database system, consistent with disclosed embodiments.

FIG. 7 is a block diagram of service layers and of a cloud-based database system, consistent with disclosed embodiments. In some embodiments, management service 418 (FIG. 4) may control processes for backup and recovery. The management service 418 may also control queries and handle communication with client devices. The description below of management service 418 describes embodiments in which the management service 418 performs these operations. However, similar descriptions apply for other elements in system 400 for other configurations. For example, management server 424 may include the features discussed below in certain embodiments in which the management server 424 is configured to perform query processing operations in system 400. Alternatively, controller/scheduler 510 (FIG. 5) may include the layers described below. Further, controller 322 or DM system 320 (FIG. 3) may include one or more of the layers described in FIG. 7. Thus, the description with respect to management service 418 is only exemplary and similar configurations may apply to elements in other systems described above.

FIG. 7 shows modules or elements in the management service 418 (FIG. 4). In some embodiments, management service may include each one of the modules shown in FIG. 7. Thus, in some embodiments, management service 418 may include a security layer that includes modules or processes for authentication, access-control list (ACL), security, and audit logging. Management service 418 may also include a connectivity layer that include APIs for communication with, for example, input module 412 and client devices 350. The APIs may include a gRPC (gRPC Remote Procedure Calls) API or a REST API. Additionally, the connectivity layer in management service 418 may include one or more web sockets that enable connection with other elements of the system. In some embodiments, web sockets may be configured as dedicated ports or services to improve backup availability. For example, in certain embodiments the connectivity layer may be dedicated to connecting with application private cloud 430 to improve connective and response times.

Figure 17A:
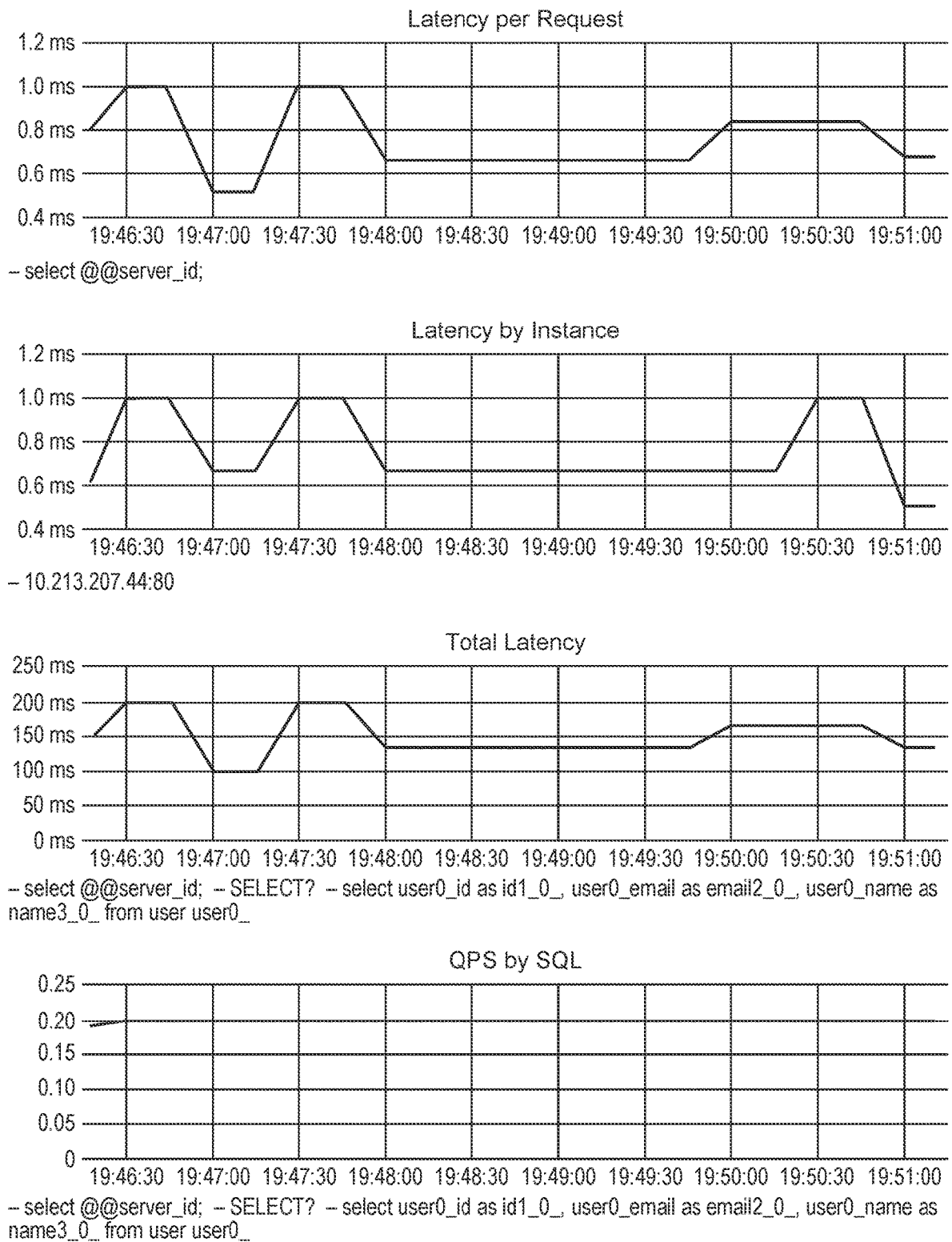
FIG. 17A shows exemplary graphical user interfaces showing database historic performance monitors, consistent with disclosed embodiments.
Figure 17B:
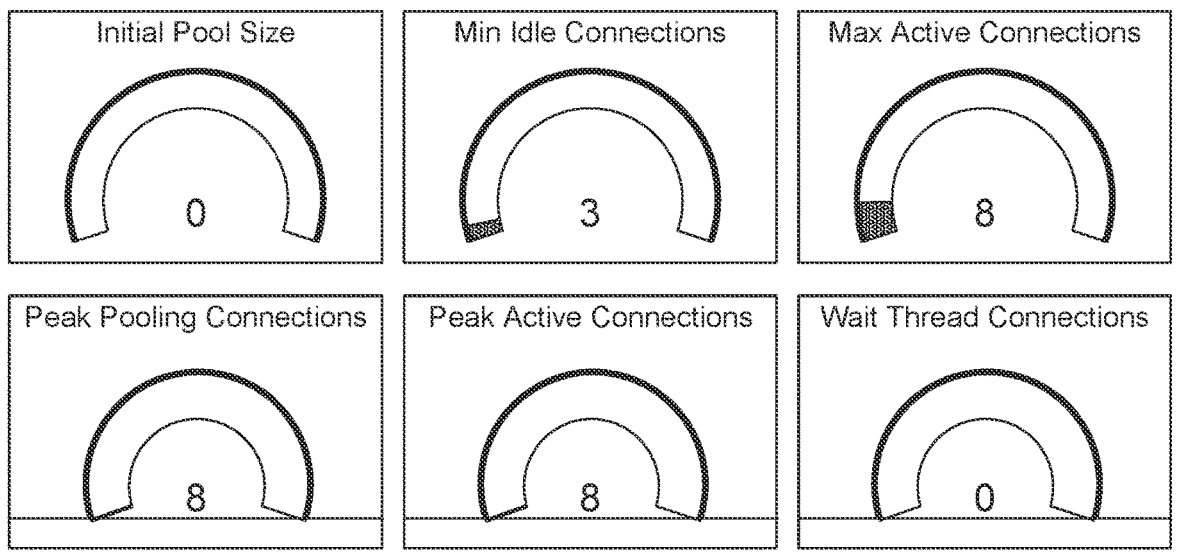
FIG. 17B shows exemplary graphical user interfaces showing database real-time performance monitors, consistent with disclosed embodiments.

FIG. 7 also shows a monitoring layer in management service 418. The monitoring & query layer that includes multiple modules for monitoring operations of databases during regular operation, during backing up processes, and/or during recovery processes and to perform data queries, configure backup configurations, and trigger backup or recovery processes. The monitoring & query layer may include scripts modules, or subsystems, for deployment & scale of database architectures or replica nodes. The monitoring & query layer may also enable displaying or generating an operation console, and starting or configuring backup and restore processes. The monitoring & query layer may also trigger the collection or analysis of metrics, query analytics, and SQL advisory. Further, the monitoring & query layer may also include a health monitor that, as further discussed in connection with FIGS. 17A-17B, provide information about the database operation.

As shown in FIG. 7, the different layers available in management service 418 may be available, or may control, other elements in the system such as node 432A, manage agent 610, topology manager 420, event monitor 416, or a cloud API (which may generate the connection to application private cloud 430 (or cloud storage 504 in embodiments that implement it).

Figure 8:
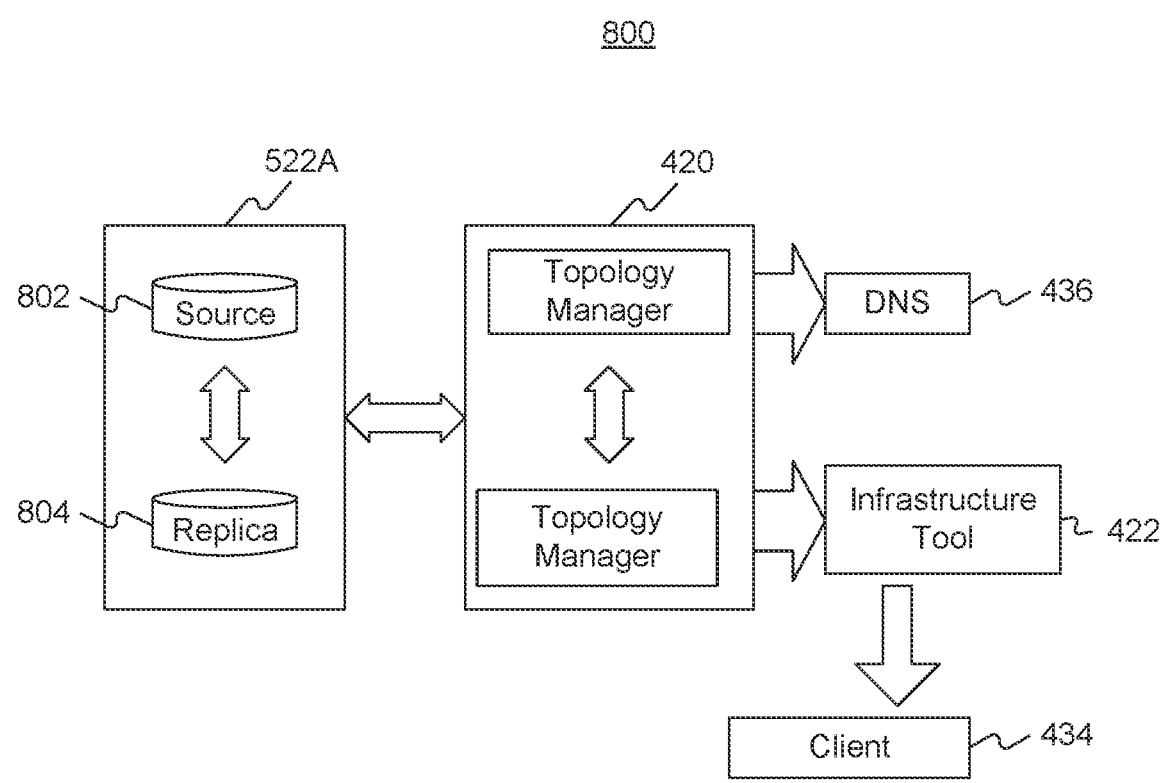
FIG. 8 is a block diagram of a client communication implementation, consistent with disclosed embodiments.

FIG. 8 is a block diagram of a client communication implementation 800, consistent with disclosed embodiments. FIG. 8 shows an exemplary embodiment in which the cloud-based back-ups are designed to have high availability. In the implementation shown in FIG. 8, topology manager 420 updates the topology dynamically as change are detected in the database (database 520 node 522A in the example shown in FIG. 8). While FIG. 8 uses database 520 as an example, other databases may be controlled through topology manager 420 (such as local databases 325 or DB 616). Further, for the implementation shown in FIG. 8 read/write endpoints are managed through DNS 436. In such embodiments, DNS 436 may be implemented with a failover downtime that is computed based on with the DNS TTL (time to live), Java virtual machine (JVM) cached TTL, poll interval (the period of time between the end of the timeout period of the last retry or completion of a network request), and the number of seconds to wait for more data or a heartbeat signal from the source before the replica considers the connection broken, aborts the read, and tries to reconnect (slave_net_timeout). In some embodiments, DNS 436 may control traffic based on these parameters by, for example, stablishing fail over downtime as the sum of DNS TTL+ JVM cached TTL+Poll Interval+slave_net_timeout.

As shown in FIG. 8, the implementation of may also include infrastructure tool 422, bridging topology manager 420 with client application 434. Similar to DNS 436, infrastructure tool 422 may also include a triggered failover. But unlike the failover of DNS 436, the failover determined by infrastructure tool may neglect TTL.

The design or implementation of FIG. 8 enhance availability of the data stored in source 802 and replica 804 partitions in nodes within a database. The design in FIG. 8 enables for constant monitoring and rearrangement by the topology manager. These configurations may minimize response times even during backup or recovery processes as the allow for parallel utilization of resource through DNS 436 and infrastructure tool 422.

Figure 9:
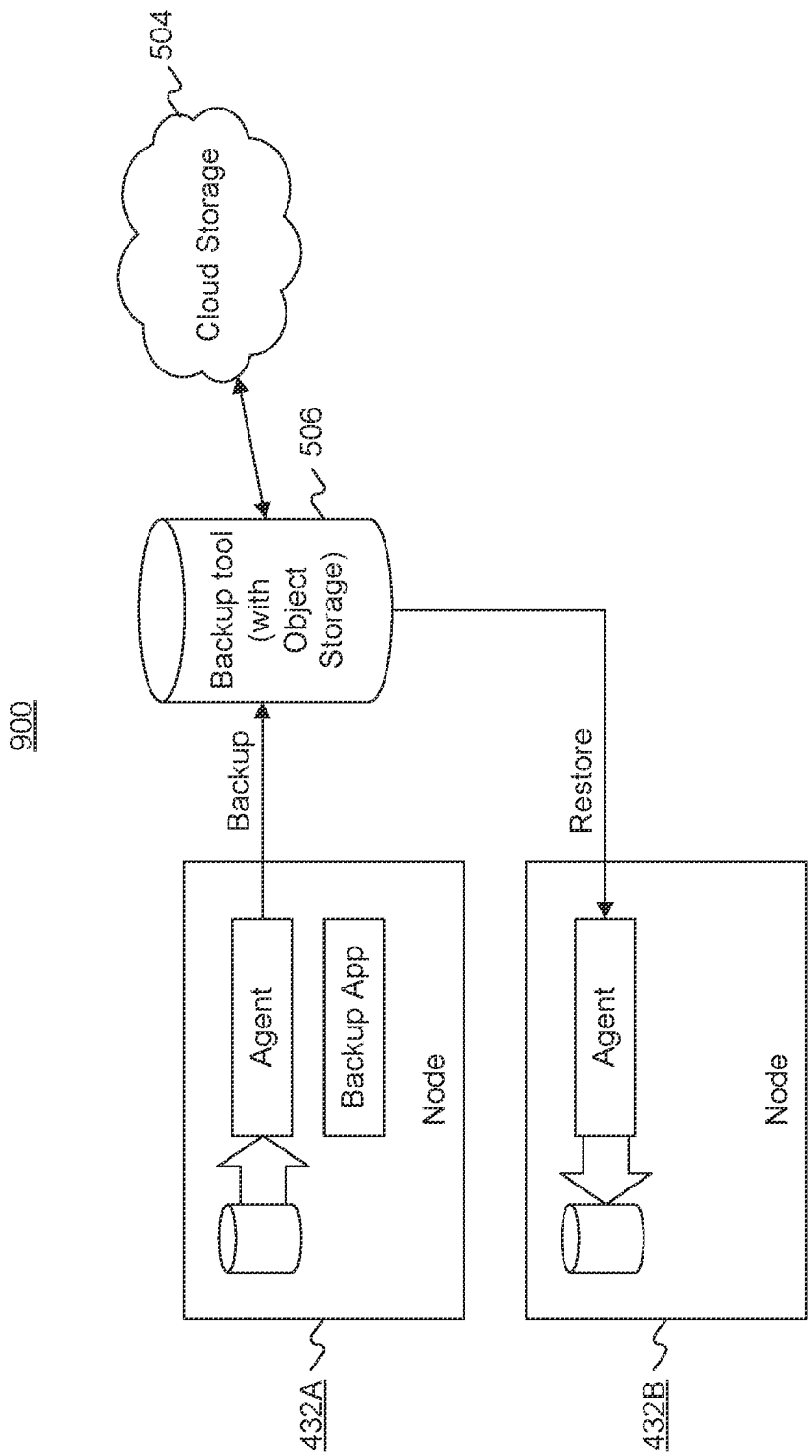
FIG. 9 is a block diagram of a cloud-based database backup implementation, consistent with disclosed embodiments.

FIG. 9 is a block diagram of a cloud-based database backup implementation 900, consistent with disclosed embodiments. FIG. 9 shows a possible implementation for backup & restore. As shown in FIG. 9, a node 432A is backed up to backup tool 506. For example, controller/scheduler 510 may configure backup tool 506 (both not shown in FIG. 9) for backing up information of node 432A in cloud storage 504. In such scenarios, a backup app may be run in node 432A by an agent (e.g., manage agent 610, FIG. 6). Through the backup app, the agent may generate one or more incremental snapshots, monitor changes to generate additional snapshots, and coordinate with controller/scheduler 510 to generate entries for meta DB 502. As further discussed in connection with FIG. 5, in some embodiments backup tool 506 may provide temporary storage and perform operations for encryption/decryption before sending snapshots (or recovery data) to the cloud storage.

During recovery (e.g., when one of the nodes needs to be restored), information from cloud storage 504 may be retrieved and stored in a different node (node 432B in the example of FIG. 9). For example, controller/scheduler 510 may request through a communication layer, like the one disclosed in connection with FIG. 7, to request recovery of certain node. Backup tool 506 may transmit the request to cloud storage, identify hot and cold data in the request and initiate the recovery process. In some embodiments, the recovery may include decryption of encrypted snapshots and the query of meta DB 502 to assemble volumes based on incremental snapshots. In such embodiments, processed data may be restored to a node (such as node 432B). An agent in the node (such as manage agent 610) may perform the operations to assemble incremental snapshots, coordinate them, and restore data in a local database. Further, while in some embodiments the encryption decryption tasks may be performed within cloud storage 504 (or generally outside nodes), in other embodiments the decryption tasks may be performed within nodes by agents.

The implementation described in FIG. 9 improves the backup and restore process by providing an architecture for a fully online and incremental backup. As further discussed in connection with FIGS. 13-14, the disclosed embodiments save time, improve security, and simplify consistency verification. For example, the implementation described in FIG. 9 saves time by streaming backup files to avoid temporary files. As shown in the FIG. 9 the agent in node 432A may be permanently streaming backup files and the backup app may be operating on replica partitions (instead of primary partitions). Further, through the implementation in FIG. 9 it may be possible to aggregate disks for faster restore (e.g., by object storage/disk), and by enabling the selection of hot and cold data based on the requests during recovery. Further, the implementation in FIG. 9 improves response times by restoring to a local SSD. The implementation of FIG. 9 also enable the agent in the recovery node (node 432B) to verify consistency. And, as further discussed in connection with FIG. 5, using encryption/decryption of incremental snapshots improve security when utilizing cloud storage 504.

Figure 10:
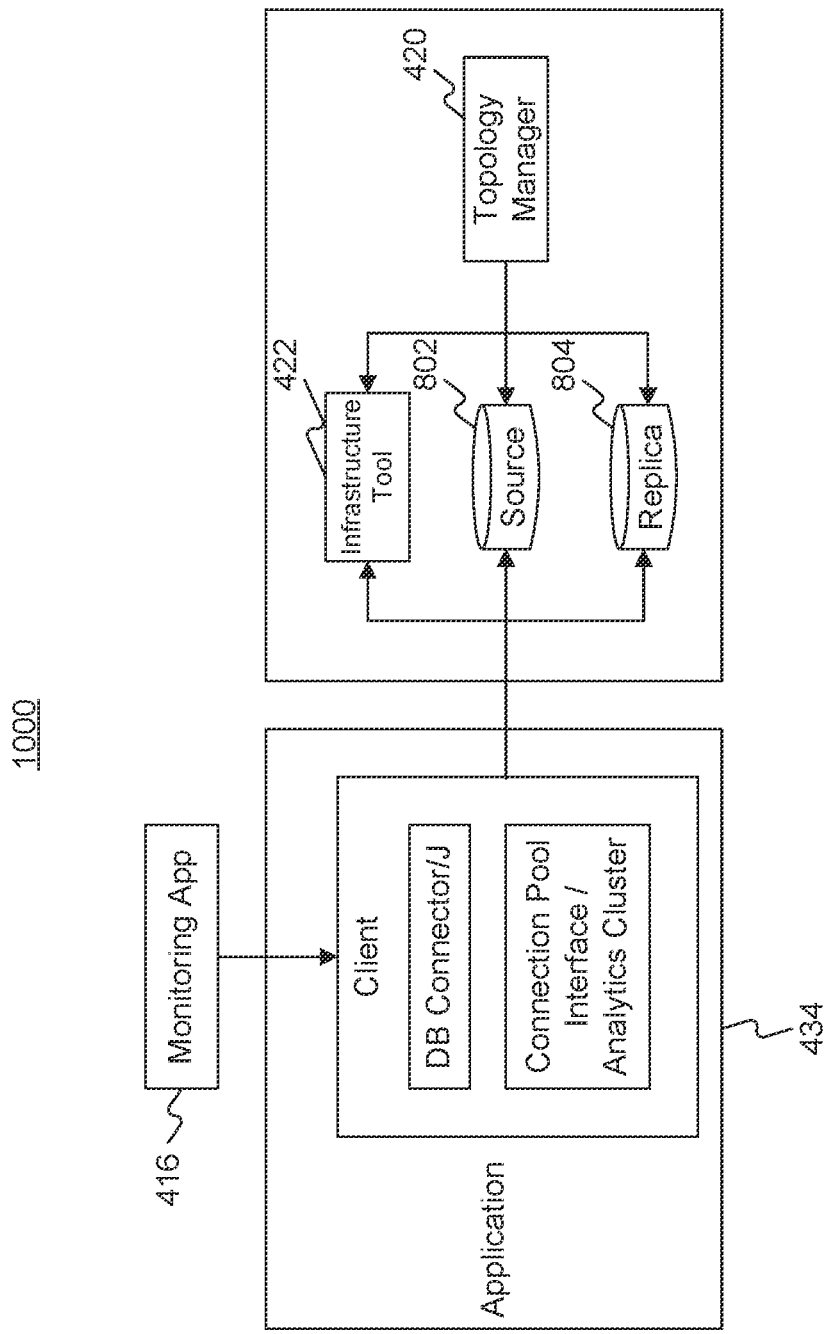
FIG. 10 is a block diagram of a database monitoring implementation, consistent with disclosed embodiments.

FIG. 10 is a block diagram of a database monitoring implementation 1000, consistent with disclosed embodiments. FIG. 10 shows how event monitor 416 may communicate with application private cloud 430 (FIG. 4), to monitor the status of nodes 432. This configuration may enable triggering the generation snapshots only when there are chances in the database volumes. For example, as further discussed in connection with FIGS. 11 and 13, incremental snapshots may be generated only when there are changes in the database volumes (and only for the modified sections within the volumes). To identify those changes, event monitor 416 (or a similar element such as controller 322) may generate signals that allow the generation of the incremental snapshots. For example, DM system 320 may be configurable use signals from an element like event monitor 416 to determine that changes in databases that trigger the generation of incremental snapshots for backup.

As shown in FIG. 10, in the exemplary implementation for monitoring event monitor 416 communicates directly to client application 434. Client application 434 may implement a Java API for connectivity to event monitor 416 and nodes 432. The DB connector may define how a client may access a database, report events, and handle requests. In some embodiments, the DB connector may include a Java-based data access technology used for Java database connectivity. Alternatively, or additionally, the DB connector may bridge connections to any Open Database Connectivity (ODBC)-accessible data source through a virtual machine. Client application 434 may also include a connection pool interface and/or and analytics cluster. In such embodiments, client application 434 may implement an object in the physical layer to describe access to the data source (e.g., nodes 432). A connection pool in client application 434 may contain information about the connection between the application private cloud 430 and other components of system 400. In some embodiments, client application 434 may create a physical layer by importing a schema for a data source from infrastructure tool 422. Client application 434 may also implement an analytics cluster. In such embodiments, client application 434 may perform operations to cluster changes or requests to improve bandwidth utilization during communications with event monitor 416. For example, client application 434 may group changes identified in nodes 432 and infrastructure tool 422 and report groups of changes to event monitor 416 with a predetermined periodicity. Alternatively, or additionally, client application 434 may perform pre-processing and analytics that get reported to event monitor 416. For example, client application 434 may analyze the file size of changes, run statistical analysis of generated incremental snapshots, and/or determine query statistics from the DB connector.

FIG. 10 shows the connectivity between topology manager 420 and source 802 and replica 804 partitions in a node. This same configuration may be replicated in other nodes. For example, topology manager 420 may be connected with a plurality of nodes 432 (such as nodes 432A and 432B). Further, topology manager 420 may be connected directly to nodes 522 in system 500. As shown in FIG. 10, topology manager 420 may be connected in parallel with source 802 and replica 804 to facilitate coordinating the management of metadata. Further, infrastructure tool 422 may be connected to the nodes and to replica 804 and source 802. In this way, infrastructure tool can communicate with client application 434, topology manager 420, and the nodes (e.g., nodes 432 or nodes 522) to maintain an accurate representation of the infrastructure in the database and report not only changes in volumes within the nodes but also topographical or architectural changes in the database that can be used to update metadata associated with incremental snapshots. As the snapshots themselves may not include structural information of nodes, infrastructure tool may periodically review an update structures on topology manager 420 to, for example, update DNS 436. Similarly, elements in system 500 (FIG. 5) may update backup tool 506 so during recovery the incremental snapshots are correctly assigned to nodes 522.

Figure 11:
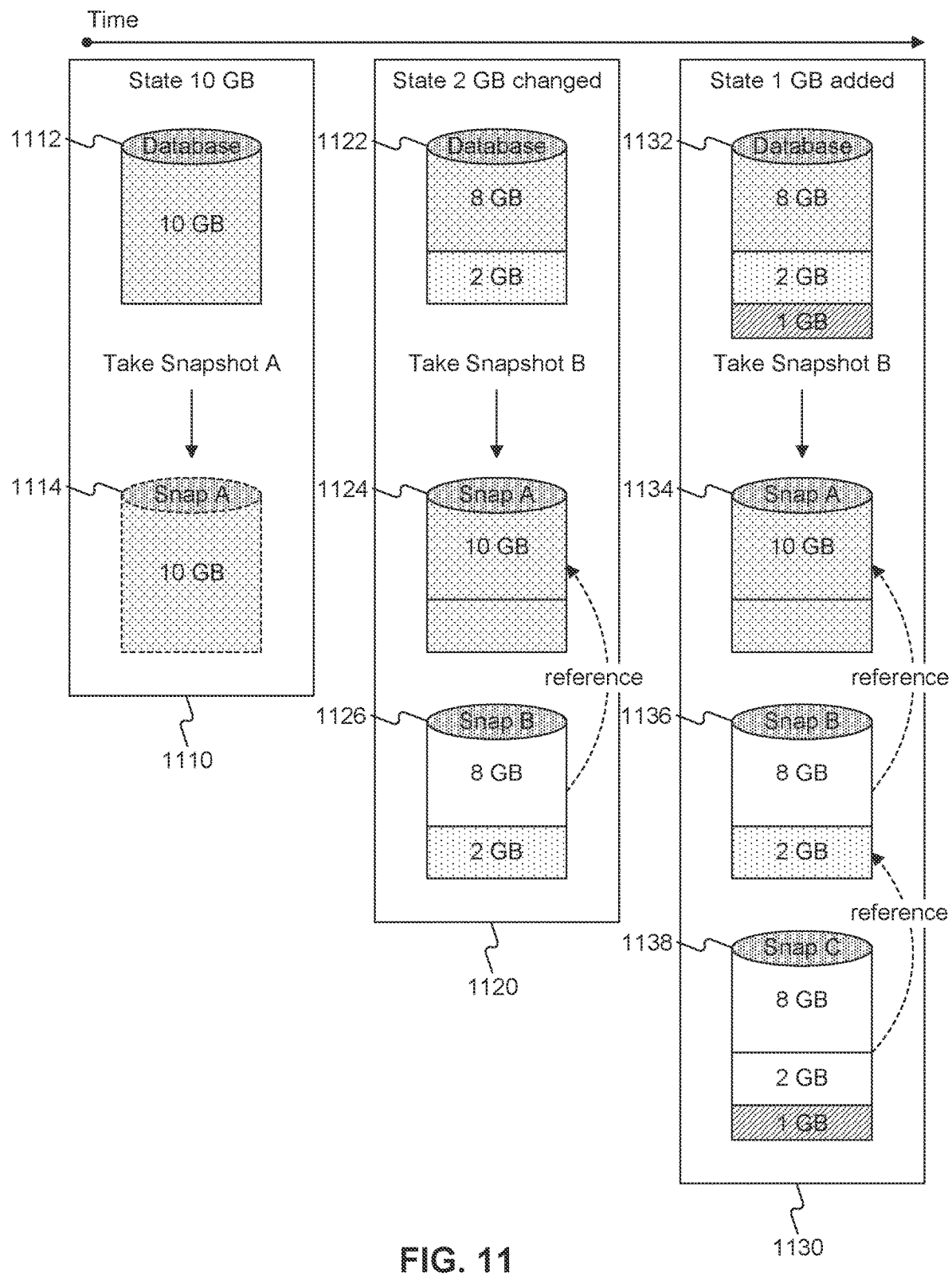
FIG. 11 is a schematic representation of incremental database snapshots in a time sequence, consistent with disclosed embodiments.

FIG. 11 is a schematic representation of incremental database snapshots in a time sequence, consistent with disclosed embodiments. FIG. 11 shows the generation of incremental snapshots for backing up database volumes. The process represented in FIG. 11 may be performed by DM system 320. Alternatively, or additionally, the process represented in FIG. 11 may be executed by other components of systems 300, 400, or 500. For example, the process represented in FIG. 11 may be performed by controller 322, platform 410, and/or controller/scheduler 510. While the description of FIG. 11 below focuses on operations by DM system 320, other elements (or combination of elements) may execute the disclosed operations.

In some embodiments, DM system 320 may generate incremental snapshots at different timepoints as described in FIG. 11. From an initial state in the left of FIG. 11, DM system 320 may generate an initial snapshot (Snapshot A), which may capture the entire volume. In some embodiments, this initial snapshot may be performed according to a scheduling (e.g., determined by controller/scheduler 510). Alternatively, or additionally, the initial snapshot may get generated when a node is activated. For example, when topology manager 420 identifies that nodes 432 includes a new node, it may trigger the generate of an incremental snapshot with the complete volume. This incremental snapshot may be encrypted, compressed, and transmitted to cloud storage (e.g., cloud storage 504) for generating a backup. FIG. 11 shows an exemplary embodiment in which the snapshot is for a complete volume of 10 GB and the entire volume is replicated in the snapshot.

As time progresses there may be changes in the volume. As shown in the example of FIG. 11, 2 GB (or 20%) of the volume changed at the state 2. In such scenarios, DM system 320 may generate the second snapshot (Snapshot B) which would only cover the modified portion of the volume (without covering the 80% that has not been modified). In addition, the second snapshot may have a reference to the first snapshot. The second snapshot may include metadata that chain the second snapshot with the first snapshot. In this way, DM system 320 may identify the chain of snapshots that would replicate the entire volume. While FIG. 11 shows the reference being part of the snapshot, in certain embodiments (as further discussed in connection with FIGS. 3 and 5) the metadata information relating different snapshots may be stored independently (outside the snapshots) like in meta DB 502 (FIG. 2).

FIG. 11 shows that DM system 320 generates a third snapshot. This third snapshot captures a second change in the volume. The second change is smaller than the first change and in a different location than the first change. DM system 320 may generate a snap of only the modification, and—like for the previous snapshot—generate a reference to the preceding snapshot. This sequence of snapshots allow the system to more efficiently generate copies that can be stored in the cloud. FIG. 11 shows the snapshots are incremental backups, which means that only the blocks on the device that have changed after your most recent snapshot are saved. Each snapshot contains all the information that is needed to restore data (from the moment when the initial snapshot was taken) to a new volume.

In certain embodiments, the file size of the incremental snapshot may be configured to decrease by specified multiples. For example, while the first snapshot may be for the entire volume, the second snapshot may be limited to half of the volume, the third snapshot may be limited a fourth of the volume, and the fourth snapshot may be limited to an eighth of the volume. By specifying the snapshot size a priori, the system may have more uniform snapshots throughout the system to facilitate referencing and recovery. In such embodiments, when the snapshots reach a negligible file size, the snapshots may be reset, having an initial snapshot to start to loop of sequentially smaller snapshots. Such implementations may provide a more uniform topography of snapshots that can be easier to sort and/or fetch during recovery stages.

Figure 12A:
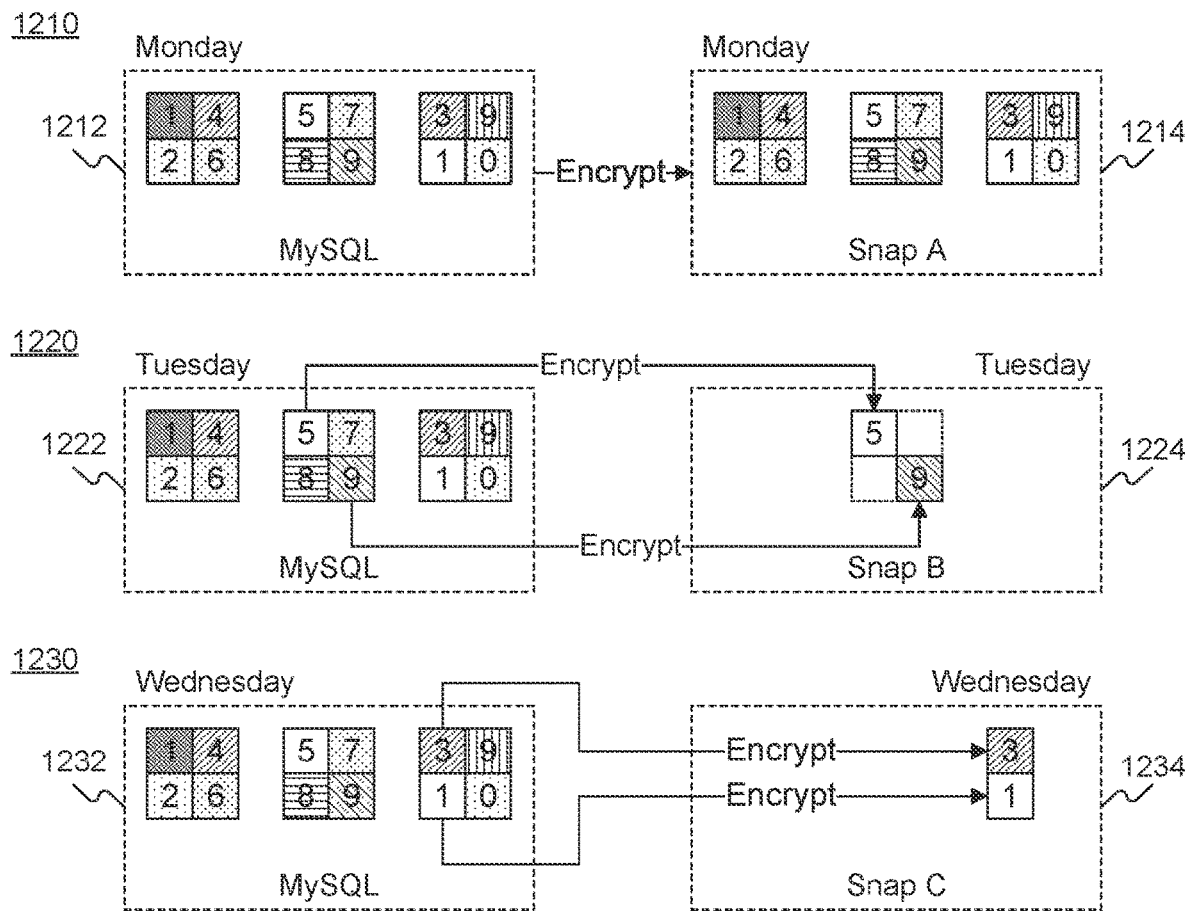
FIG. 12A is a schematic representation of snapshot uploads to a cloud service, consistent with disclosed embodiments.

FIG. 12A is a schematic representation of exemplary snapshot uploads to a cloud service, consistent with disclosed embodiments. FIG. 12A shows the status of local and cloud storage during a backup process using incremental snapshots. The representation in FIG. 12A shows that a local DB (e.g., local databases 325, DB within nodes 432, storage 438, or database 520) includes different volumes with different partitions. The representation also shows a cloud storage (e.g., online resources 340, third-party systems 360, application private cloud 430, or cloud storage 504). The representation shows the status of the local DB and the cloud in different times in which there is a change of data stored in the volumes. While the representation in FIG. 12A shows days for first time 1210, second time 1220, and third time 1230, the periodicity of the representation is only exemplary and different periods are possible. For example, the periods may be every minute, every hour, or every second. Alternatively, or additionally, there may be no period for updates between local DB and cloud storage because, as further discussed in connection with FIGS. 4, 13, and 15, the communication between local DB and cloud may be triggered by identification of changes in nodes of the database.

In the example of FIG. 12A, DM system 320 flushes logs to ensure that all data in memory is saved on disk when launching a backup. For example, during the first time 1210 backup tool 506 implemented by DM system 320 may flush logs and store data in replica partitions of nodes in the local DB. The DM system 320 may then freeze the file system of local DB at instance 1212 to make the file system temporarily unwritable and start making a snapshot backup. As mentioned above, in connection with FIG. 11, the snapshot may be incremental, capturing only changes in the volume. Further, as also discussed in connection with FIGS. 13 and 15, the snapshots generated at first time 1210 may be encrypted. Further, the snapshots, once encrypted or without encryption (when cloud storage 504 performs the encryption) are uploaded to cloud storage by chunks and/or streaming. As shown in FIG. 12A, in the initial stage of backup partitions and nodes of partitions may be encrypted and transmitted to cloud instance 1214. In some embodiments, as discussed above in connection with FIG. 6, encryption tasks may be performed in parallel. For example, through management agent 610 the nodes may perform parallel encryption tasks. Incremental snapshot backups described in FIG. 12A minimize the time required to create the snapshot and saves on storage costs by not duplicating data.

In second time 1220, DM system 320 may identify changes in certain nodes of the local DB, in DB instance 1222. In the example, DM system 320 may identify changes in partitions 5 and 9 of one of the nodes in local DB. In such embodiments, incremental snapshots of only those modified partitions may be created, encrypted, and uploaded to cloud storage, in cloud instance 1224. FIG. 12A shows that the snapshots would be placed in the corresponding sections of the copy in cloud instance 1224. While in some embodiments the snapshots in instance 1224 may replace initial snapshots (e.g., in instance 1214), in other the incremental snapshots in second time 1220 may be stored in a different location and point to the locations identified in instance 1214. For example, to avoid having to delete, format, and rewrite a section, cloud instance 1224 may simply write the incremental snapshot in a different location and include in a metadata database (e.g., meta DB 502) the corresponding locations of the incremental snapshots. As shown in FIG. 12A, the incremental snapshots generated in second time 1220 may also be encrypted before, while, or after uploading to cloud instance 1224.

In third time 1230, DM system 320 may identify changes in certain nodes of the local DB, in DB instance 1232. In the example, DM system 320 may identify changes in partitions 3 and 1 of one of the nodes in local DB. In such embodiments, incremental snapshots of only those modified partitions may be created, encrypted, and uploaded to cloud storage, in cloud instance 1234. FIG. 12A shows that the snapshots would be placed in the corresponding sections of the copy in cloud instance 1224. While in some embodiments the snapshots in instance 1234 may replace initial snapshots (e.g., in instance 1214), in other the incremental snapshots in third time 1230 may be stored in a different location and point to the locations identified in instance 1214. As discussed above, by having pointers to locations (instead of making substitutions) the encrypted snapshots can be store and located faster in the cloud storage without compromising recovery speed.

Figure 12B:
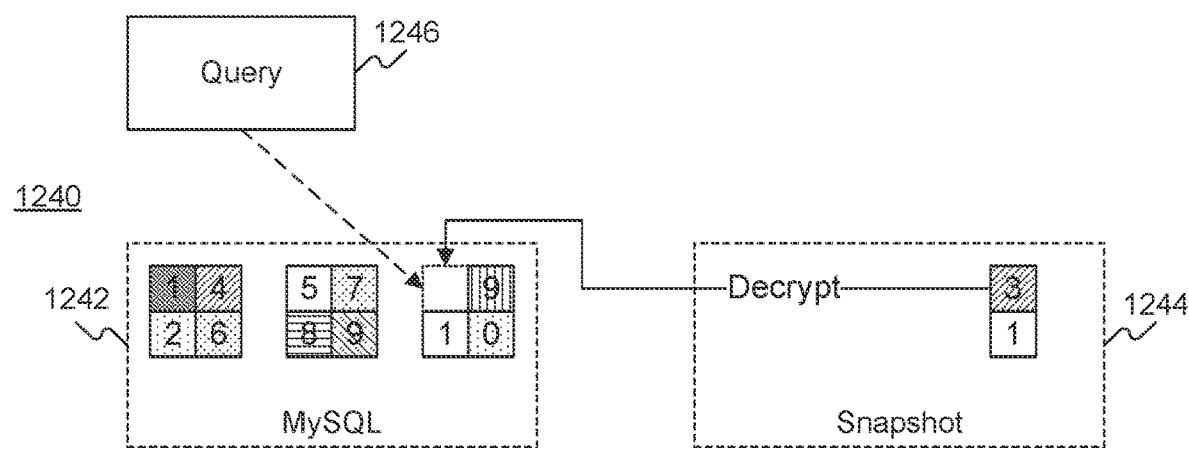
FIG. 12B is a schematic representation of snapshot downloads form a cloud service, consistent with disclosed embodiments.

FIG. 12B is a schematic exemplary representation of snapshot downloads form a cloud service, consistent with disclosed embodiments. FIG. 12B shows an exemplary embodiment of a recovery process based on a query. This process of may improve availability and persistence of backup information stored in the cloud even during recovery stages. In such embodiments, DM system 320 may fetch snapshots or recovery data from cloud storage by deferring initialization of decryption or snapshot retrieval until receiving a query or request. Through this recovery system, DM system 320 can improve efficiency in operation. For example, as shown in FIG. 12B, fetching information from cloud storage may be deferred until it is necessary to resolve a client query. Alternatively, in other embodiments (not shown), DM system 320 may perform eager loading of the snapshots and permanently fetch information to reconstruct missing or corrupted partitions in local DB.

The representation in FIG. 12B shows the status of local DB and cloud storage at a fourth time 1240. At this stage DM system 320 may receive a query 1246. For example, through network 370 DM system 320 may receive a request for information stored in local database 325. In response to the query, DM system 320 may identify a missing volume, partition, or node, in the local DB instance 1242. For example, as further discussed in connection with FIGS. 14 and 16, DM system 320 may determine that a client query cannot be completed because there is missing information. In such scenario, DM system 320 may fetch a snapshot for recovery from the cloud instance 1244, which includes the incremental snapshots generated in third time 1230.

As shown in FIG. 12B, the incremental snapshot may be decrypted within the cloud storage. In other embodiments, the incremental snapshot may be decrypted on-the-fly, or locally, once the information is transmitted. Regenerating the node or partition in local DB may also include consulting meta DB 502 to identify position, sequence, and/or accessibility of the recovered partition. Once the data is recovered, DM system 320 may respond to query 1246 by, for example, providing the requested information.

When restoring a replica with a snapshot backup, DM system 320 may create a new database from existing snapshots. Thus, after a replica is created from a snapshot, there is no need to wait for all the data to transfer from cloud storage to volume the local DB can start accessing the volume and all its data. But if DM system 320 determines that accessed data has not been loaded, the DM system 320 may be configured to immediately download the requested data from cloud storage and continue loading the rest of the data in the background. Although this on-demand approach may require some time and increases latency of operation the first time each trunk is accessed, this approach liberates resources to allow for dynamic and on-demand loading.

To minimize latency, however, DM system 320 may pre-load data that will be likely accessed in resolving the query. For example, when query 1246 is directed to an operation that normally generates additional queries for additional information (e.g., a user login then may generally require display of a user webpage or user preferences) DM system 320 may identify cold and hot data in volumes using predictive analytics. The hot data may be predownloaded in a pre-warming operation to minimize latency during recovery. In certain embodiments, when the query will primarily generate writing requests (instead of reading requests) DM system 320 may not conduct pre-warming operations as the latency from read request may not be significant and resources for pre-warning should be allocated somewhere else. Further, hot data may be located in specific locations in DM system 320. For example, hot data may be kept near processing CPUs' and in volumes with reduced latency. In contrast, cold data—data that is not required often—may be kept in busier locations that have longer latencies.

However, for fast recovery scenarios, DM system 320 may identify hot data and to load the hot data into volume, which is likely to cover the most scenario query. In the example above, with a query for user name DM system 320 may load pre-warming modules with user page information (e.g., loading information for cart page as shown in FIG. 1D).

In some embodiments, to identify hot data, DM system 320 may analyze general logs to determine which data is more likely to be accessed next. For example, DM system 320 may employ regressions on the general log to separate hot from cold data based on query 1246. Alternatively, or additionally, DM system 320 may train a machine learning model using the general log to generate a classifier of hot and cold data based on query 1246. DM system 320 may then prewarm a volume only taking the hot data from cloud storage in instance 1244. Such configuration may improve the recovery process by reducing input/output operations and making a speed-up compared with full recovery. Data identified as cold data may be loaded into volume by on-demand loading. The machine learning models may include convolutional neural networks, random forests, among others.

Using pre-warming based on analysis of general logs and parameterized based on receive query may shorten the time of pre-warming and realize fast scale out a replica.

Figure 13:
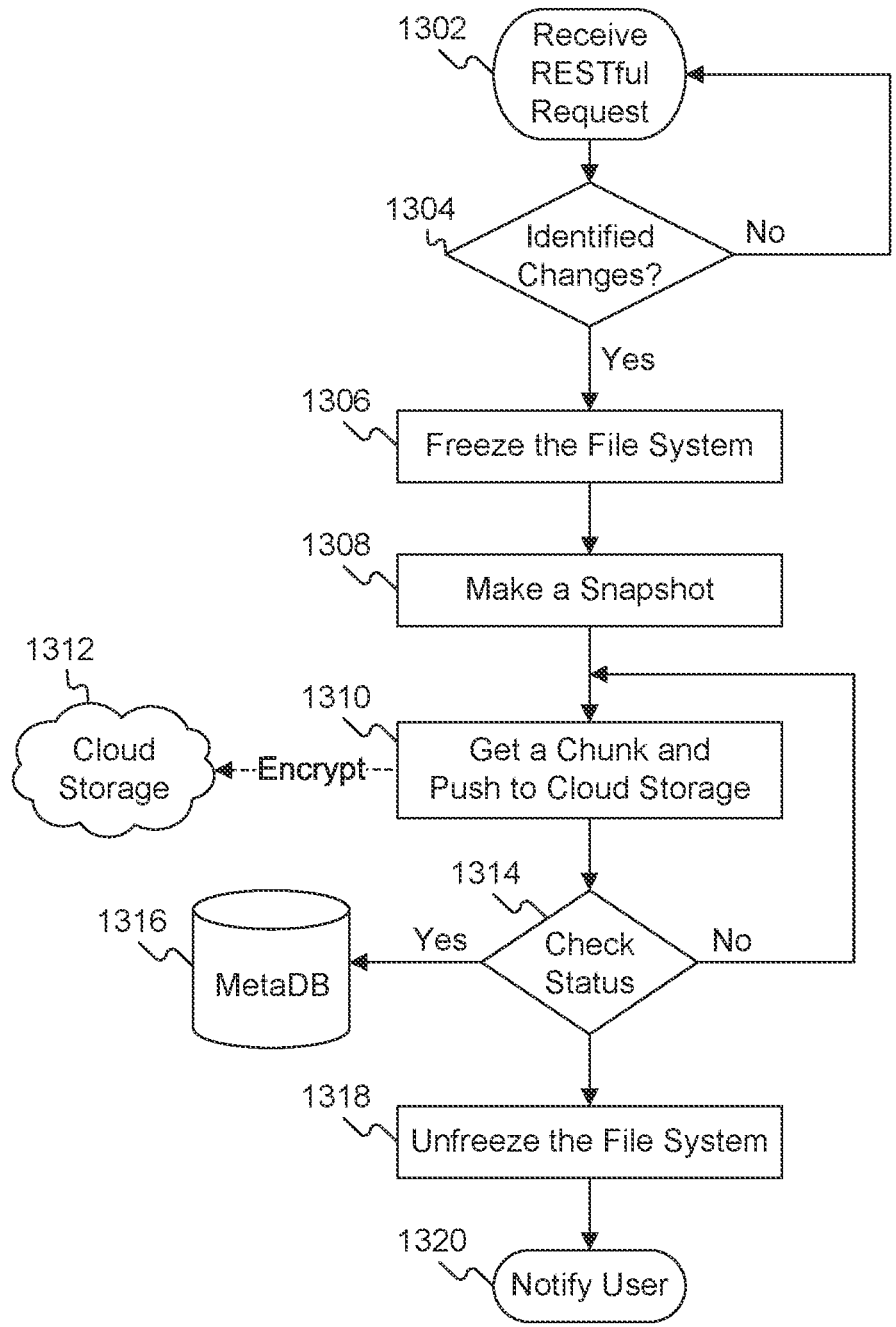
FIG. 13 is a flow diagram of an exemplary process for secure cloud-based backup of a database, consistent with disclosed embodiments.

FIG. 13 is a flow diagram of an exemplary process 1300 for secure cloud-based backup of a database, consistent with disclosed embodiments. In some embodiments, elements of system 300 may perform process 1300. For example, as disclosed in the steps description below, DM system 320 may perform process 1300. Alternatively, or additionally, online resources 340 may perform process 1300, or parts of process 1300. Further, in other embodiments system 100, or parts of system 100, may perform process 1300. For instance, external front end system 103 and/or SAT 101 may perform process 1300. Further, in other embodiments systems 400 or 500 may implement process 1300. For example, platform 410, backup tool 506, and/or controller/scheduler 510 may perform operations in process 1300.

In step 1302, DM system 320 may receive a request. The request may include initiation of a backup process. For example, a user may initiate a backup process in input module 412 that generates a RESTful request to DM system 320 for generating or initiating a backup process.

In step 1304, DM system 320 may determine whether there are any changes in the database. For example, using monitoring modules (like event monitor 416, FIG. 4) DM system 320 may determine whether there has been any change in the database. As discussed in connection with FIG. 4, determining changes in the databases may involve monitoring the status of infrastructure tool 422. Alternatively, or additionally, backup tool 506 may monitor the information on nodes 522 and generate change signals based on determining changes in the nodes. These signals may be used by DM system 320 to determine that a change has happened. As shown in FIG. 13, in some embodiments DM system may be configured to determine whether data in the at least one of the plurality of nodes has changed in response to a RESTful request from an input module (like the request in step 1302). For example, controller 322 may be configured to determine changes in the nodes upon receiving a client query.

If DM system 320 determines that a change has not happened (step 1304: No), DM system 320 may return to step 1302 and continue monitoring for client requests. Additionally, or alternatively, DM system 320 may generate a notification to present to users indicating that no backup operation is necessary because there are no changes. However, if DM system 320 determines that a change happened, or identifies a change (step 1304: Yes), DM system 320 may continue to step 1306.

In step 1306, DM system 320 may freeze the file system to prevent additional writing. The freeze system may be specifically frozen for nodes or partitions to prevent additional writing during the backup operation. In some embodiments, only replica portions (e.g., replica 804) may be frozen, while source portions (e.g., source 802) continue operating and are accessible and modifiable through request. DM system 320 may freeze the file system through flushing buffers and pages in the file system cache that contain metadata and user data. The freeze file system may suspend any new activity on the file system until the file system is thawed or unfrozen. Further, in some embodiments freezing file system may temporarily blocks input operations and record current operations to be synchronized later. In some embodiments, when instructed to freeze the file system (e.g., to generate a backup) DM system 320 may reschedule freezing by determining whether the file system is in a low time, in response to determining the file system is in a low time, freeze the file system, and in response to determining the file system is not in a low time, schedule freezing the file system at a later time and delaying generation of the incremental snapshot.

In step 1308, DM system 320 may make an incremental snapshot that captures changes of volumes (or the full volume when initializing). As discussed in connection with FIGS. 11-12A, the incremental snapshots may be generated in sequence and creating chains of references to facilitate recovery while minimizing backup redundancy.

In step 1310, DM system 320 may get a chunk of data and push it to cloud storage 504. For example, as discussed in connection with FIGS. 5, 9, and 11-12A, DM system 320 may generate a stream of incremental snapshots that are uploaded in chunks to cloud storage 504 in step 1312. And as further discussed in FIGS. 5, 9, and 11-12A, uploading the chunks may include encryption of the chunks and/or individual snapshots to improve security of the backed up data.

In step 1314, DM system 320 may determine whether the backup was completed. For example, DM system 320 may determine whether the backup process has captured all the changes in the database that were identified in step 1304. In some embodiments, DM system 320 may perform step 1314 by checking whether the change detected has been fully backed. For example, DM system may, after uploading the encrypted copy, determine whether the first data change was captured in the incremental snapshot. Then, DM system may, in response to determining the first data change was not captured, in the incremental snapshot, generate a second incremental snapshot including a second portion of the at least one of the plurality of nodes. Further, DM system may upload an encrypted copy of the second incremental snapshot to the cloud storage.

Further, DM system 320 may determine whether the sequence of snapshots have been encrypted and transmitted. When DM system 320 determines the operation has been completed (step 1314: Yes), DM system 320 may update metadata DB in step 1316. But when DM system 320 determines the operation has not been completed (step 1314: No) it may return to step 1310 and continue the generation of incremental snapshots and chunk delivery and encryption to cloud storage 504.

In step 1318, DM system 320 may unfreeze the file system and in step 1320 DM system 1320 may notify a user (e.g., through input module 412).

In some embodiments, DM system 320 may continue performing process 1300 in an iteration as changes are detected in nodes 432 or as a backing process is configured. In such embodiments, DM system 320 may determine a second data change in the at least one of the plurality of nodes. DM system 320 may also compare the first data change and the second data change and, in response to determining the first data change and the second data change are different, freeze the file system. Then, after freezing the file system, DM system 320 may generate a second incremental snapshot of the at least one of the plurality of nodes, the incremental snapshot including a second portion of the at least one of the plurality of nodes and upload the encrypted copy of the incremental snapshot to the cloud storage.

Figure 14:
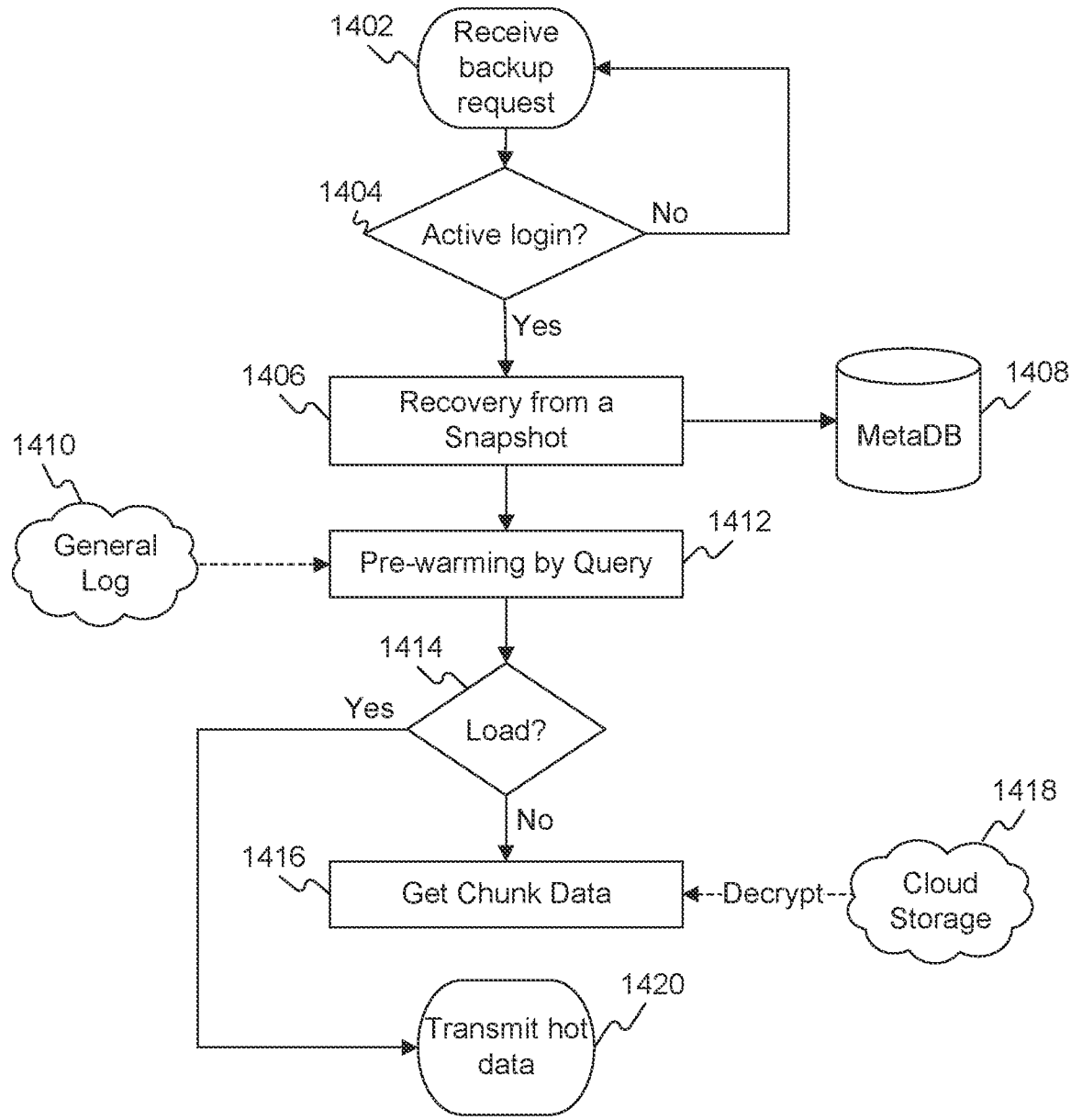
FIG. 14 is a flow diagram of an exemplary process for secure cloud-based recovery of a database, consistent with disclosed embodiments.

FIG. 14 is a flow diagram of an exemplary process 1400 for secure cloud-based recovery of a database, consistent with disclosed embodiments. In some embodiments, elements of system 300 may perform process 1400. For example, as disclosed in the steps description below, DM system 320 may perform process 1400. Alternatively, or additionally, controller 322 may perform process 1400, or parts of process 1400. Further, in other embodiments system 100, or parts of system 100, may perform process 1400. For instance, external front end system 103 and/or SAT 101 may perform process 1400. Further, in other embodiments systems 400 or 500 may implement process 1400. For example, platform 410, backup tool 506, and/or controller/scheduler 510 may perform operations in process 1400.

In step 1402, DM system 320 may receive a backup request. For example, DM system 320 may receive a request for a data volume that needs to be recovered because it is unavailable.

In step 1404, DM system 320 may determine whether there is an active login. For example, DM system 320 may determine if there is an .env file, for a profile that is active. If DM system 320 determines that there is no login active (step 1404: No), DM system 320 may continue login to step 1403 to request a login and continue to monitor user or system backup request returning to step 1402. But if DM system 320 determines that a login is active (step 1404: Yes), DM system 320 may continue to step 1406.

In step 1406, DM system 320 may identify a snapshot for recovery. For example, in some embodiments, DM system 320 may identify the snapshot for recovery by consulting meta DB 502 in step 1408. Meta DB 502 may correlate the request, with the missing or corrupted volume, and one or more incremental snapshots stored in cloud storage.

In step 1410, and as further discussed in connection with FIG. 12B, DM system 320 may perform a pre-warming by query. For example, DM system 320 may analyze a general log in step 1412, perform analysis that enables identifying hot data based on the request from step 1402 and based on the request or query pre-warm the hot data in temporary volume while leaving cold data for on-demand loading.

In step 1414, DM system 320 may determine whether the data necessary for resolving the request has been loaded. When DM system 320 determines that the data has been loaded (step 1414: Yes), DM system 320 may continue to step 1420 and transmit data to resolve the request. But if DM system 320 determines that the data has not been loaded (step 1414: No), DM system 320 may continue to step 1416.

In step 1416 DM system 320 may generate chunk data by fetching and decrypting snapshots from cloud storage 504 in step 1418. As discussed in connection with FIG. 12B the collection of snapshots may be performed for the pre-warming operation (e.g., for hot data) or for the cold data. DM system 320 may then return to step 1414 and iterate the loading determination until the data required to resolve the request has been loaded to continue with transmission in step 1420.

In certain embodiments, DM system 320 may skip steps of process 1400 during a recovery process. For example, DM system 320 may be configured to perform operations in which it receives a backup query specifying a data location, determines one or more incremental snapshots associated with the data location, downloads and decrypts the one or more incremental snapshots; and generates replica nodes based on the decrypted one or more incremental snapshots.

Figure 15:
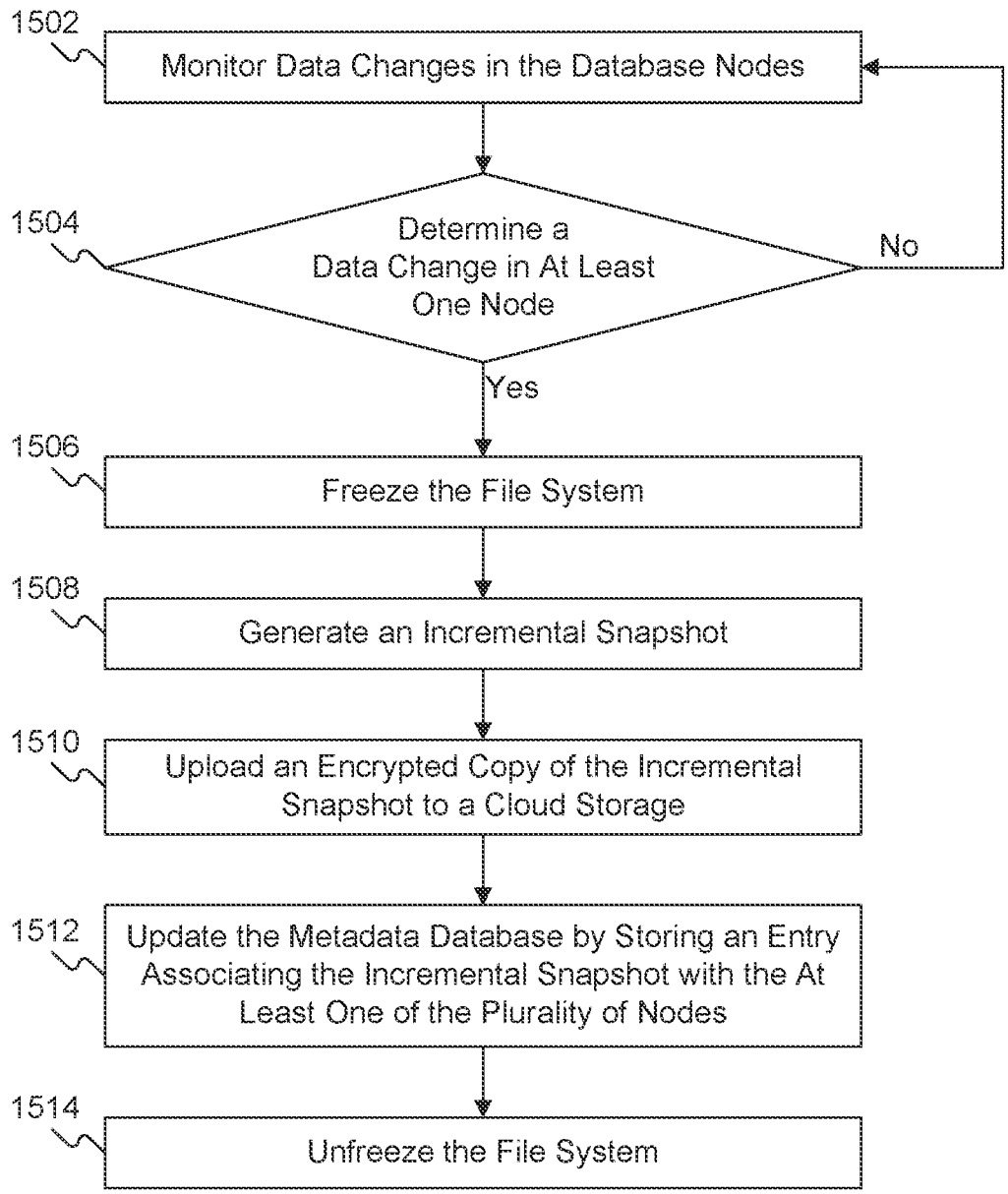
FIG. 15 is a flow diagram of an exemplary process for uploading incremental snapshots, consistent with disclosed embodiments.

FIG. 15 is a flow diagram of an exemplary process 1500 for uploading incremental snapshots, consistent with disclosed embodiments. In some embodiments, elements of system 300 may perform process 1500. For example, as disclosed in the steps description below, DM system 320 may perform process 1500. Alternatively, or additionally, online resources 340 may perform process 1500, or parts of process 1500. Further, in other embodiments system 100, or parts of system 100, may perform process 1500. For instance, external front end system 103 and/or SAT 101 may perform process 1500. Further, in other embodiments systems 400 or 500 may implement process 1500. For example, platform 410, backup tool 506, and/or controller/scheduler 510 may perform operations in process 1500.

In step 1502, DM system 320 may monitor data changes in the database nodes. For example, using a monitoring service (such as event monitor 416) DM system 320 may determine whether there are any changes in a database (such as in local data bases 325).

In step 1504, DM system 320 may determine whether there is a data change in at least one node. For example, DM system 320 may identify changes on one or more volumes of a node. When DM system 320 determines there is no change in at least one node (step 1504: No), DM system 320 may return to step 1502 and continue monitoring data changes in the database. But if DM system 320 determines there is a change in the database node (step 1504: Yes), DM system 320 may continue to step 1506.

In step 1506, DM system 320 may freeze the file system. As discussed in connection with FIG. 13, freezing the filing system may stop write operations in a node while allowing read operations. Further, in freezing the file system, DM system 320 may freeze only replica portions, without freezing source portions. In step 1508, DM system 320 may generate an incremental snapshot. As discussed in connection with FIGS. 11-13, the incremental snapshot may capture only changes in the volume.

In step 1510, DM system 320 may upload an encrypted copy of the incremental snapshot to cloud storage. For example, as discussed in connection with FIG. 5, through backup tool 506 may encrypt snapshots from nodes 522 and upload them to cloud storage 504.

In step 1512, DM system 320 may update a metadata base by storing an entry associating the incremental snapshot with the sourcing nodes. For example, DM system 320 may update meta DB 502 by including references, pointers, and other type of metadata correlating the snapshot with nodes, position in nodes, and/or volumes.

In step 1514, DM system 320 may unfreeze the file system to continue with normal operations.

Figure 16:
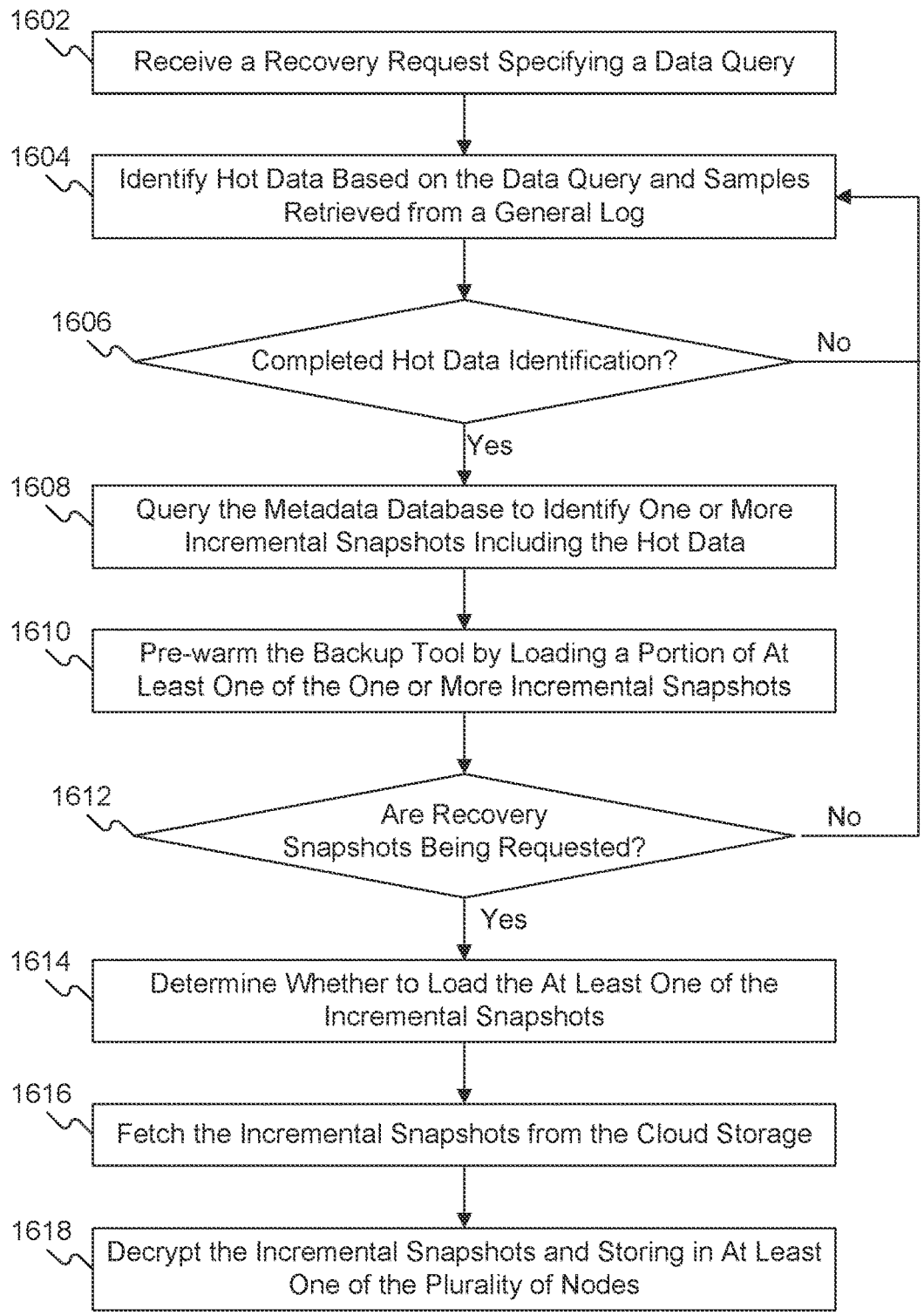
FIG. 16 is a flow diagram of an exemplary process for downloading incremental snapshots, consistent with disclosed embodiments.

FIG. 16 is a flow diagram of an exemplary process 1600 for downloading incremental snapshots, consistent with disclosed embodiments. In some embodiments, elements of system 300 may perform process 1600. For example, as disclosed in the steps description below, DM system 320 may perform process 1600. Alternatively, or additionally, online resources 340 may perform process 1600, or parts of process 1600. Further, in other embodiments system 100, or parts of system 100, may perform process 1600. For instance, external front end system 103 and/or SAT 101 may perform process 1600. Further, in other embodiments systems 400 or 500 may implement process 1600. For example, platform 410, backup tool 506, and/or controller/scheduler 510 may perform operations in process 1600.

In step 1602, DM system 320 may receive a recovery request specifying a data query. For example, as described in connection with FIG. 12B, DM system 320 may receive a request for data on the database and identify the that data is not available. In such embodiments, DM system 320 may receive a request for data that is associate with a query received, for example, from client devices 350.

In step 1604, DM system 320 may identify hot data based on the data query and samples retrieved from a general log. As discussed above in connection with FIGS. 9 and 12B, hot data may include data that will be likely accessed or requested based on the received query of step 1602. In some embodiments DM system 320 may analyze the general log using regressions and/or machine learning models to, based on the query, determine data or volumes that are more likely to be accessed than others. This may allow DM system 320 to prioritize download and decryption and store in a partial pre-warming storage (like storage 438).

In step 1606, DM system 320 may determine whether it has completed hot data identification. For example, DM system 320 may determine whether the regression or ML model has completed the identification of data that will likely be queried based on the data query. If DM system 320 determine that it has not completed hot data identification (step 1606: No), DM system 320 may return to step 1604 and continue identifying hot data. However, if DM system 320 determines that it has completed hot data identification, DM system 320 may continue to step 1608.

In step 1608, DM system 320 may query the metadata database to identify one or more incremental snapshots including the hot data. For example, as discussed in connection with FIGS. 12B and 14, DM system 320 may query meta DB 502 to determine the incremental snapshots that are responsive to the data query and/or are hot data (which is likely going to be accessed in resolving the request or in future requests).

In step 1610, DM system 320 may pre-warm the backup tool by loading a portion of at least one of the one or more incremental snapshots. For example, DM system may pre-warm backup tool 506 by configuring controller/scheduler 510 fetch and decrypt snapshots identified in for pre-warming and/or during on-demand loading.

In step 1612, DM system 320 may determine whether a client is requesting snapshots. For example, DM system 320 may determine whether a client's query is requesting data stored in the database. If DM system 320 determines the client is not requesting snapshots (step 1612: No), for example when the user is performing write operations, DM system 320 may return to step 1604 and continue identifying hot data to continue prewarming of the backup tool and/or transitory storage. In such embodiments, the transitory storage may include local memory devices, like storage 438. However, if DM system 320 determines client is requesting snapshots (step 1612: Yes), DM system 320 may continue to step 1614.

In step 1614, DM system 320 may determine whether to load the at least one of the incremental snapshots. For example, DM system 320 may determine whether the pre-warmed data would address the query request and configure the backup tool for delivery of the snapshots. If so, DM system 320 may move directly to step 1618 and decrypt the pre-warmed incremental snapshot. However, if the incremental snapshot has not been loaded in the backup too, DM system 320 may continue to step 1616 and fetch the incremental snapshot from cloud storage. In some embodiments, DM system 320 may be configured to allow access to the incremental snapshot while continuing fetching and decrypting incremental snapshots in the background.

In step 1618, DM system 320 may decrypt the incremental snapshots and store them in at least one of the plurality of nodes. For example, as discussed in connection with FIGS. 9 and 12B, DM system may restore a volume in a local database using the decrypted incremental snapshot.

In some embodiments, DM system 320 may perform processes in a sequence based on process 1600. For example, DM system 320 may perform a process in which it receives a recovery request including a data query (like in step 1602). DM system 320 may then identify hot data and cold data based on the data query and samples retrieved from a general log, where the hot data includes data files that have been accessed over a threshold number of times in a general data log and the cold data includes data files that have been accessed less than the threshold number of times in the general data log (like in step 1604). DM system 320 may also query the metadata database to identify one or more incremental snapshots including the hot data (like in step 1608) and pre-warm the backup tool by loading a portion of at least one of the one or more incremental snapshots (like in step 1610). Further DM system 320 may also be configurable to determine whether to load the at least one of the incremental snapshots, fetch the incremental snapshots from the cloud storage (e.g., cloud storage 504), and decrypt the incremental snapshots and storing decrypted snapshots in at least one of the plurality of nodes.

FIG. 17A shows exemplary graphical user interfaces showing database historic performance monitors, consistent with disclosed embodiments. GUIs shown in FIG. 17A may be generated for client devices 350 and presented through input module 412. In some embodiments, the GUIs may be generated in response to requests through specific GUI APIs. The GUIs shown in FIG. 17A may allow a user to diagnose status of the backup or recovery processes discussed above.

As shown in FIG. 17A the GUIs may include time plots for latency per request, a latency per instance, and a total latency. The GUI may also include a time plot for QPS (queries per second). These GUIs may allow a developer to identify bottle necks in resolving client requests and determine if alternative backup processes or recovery configurations should be implemented.

FIG. 17B shows exemplary graphical user interfaces showing database real-time performance monitors, consistent with disclosed embodiments. GUIs shown in FIG. 17B may be generated for client devices 350 (FIG. 3) and presented or communicated through input module 412. Alternatively, or additionally, GUIs may be communicated through internal front end system 105 (FIG. 1). In some embodiments, the GUIs may be generated in response to requests through specific GUI APIs. The GUIs shown in FIG. 17B may allow a user to diagnose status of the backup or recovery processes discussed above.

GUIs shown in FIG. 17B show graphical indicators of initial pool size, number of idle connections, active connections, peak pooling connections, peak active connections, and wait threat connections. Like GUIs in FIG. 17A, the GUIs in FIG. 17B may allow a developer to identify bottle necks during backup or recovery, and determine if alternative backup processes or recovery configurations should be implemented. However, unlike the GUIs in FIG. 17A, the GUIs in FIG. 17B may provide real time information that can be used for current monitoring (instead of timelines). For example, the indicator of active connections may allow a user to re-allocate resources for pre-warming data to enhance the pre-warming loading and reduce latency for read-heavy applications.

Another aspect of the disclosure is directed to a non-transitory computer-readable medium storing instructions that, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for database backup comprising:
a controller;
a metadata database coupled to the controller;
a backup tool coupled to the controller; and
a plurality of nodes coupled to the backup tool and accessed through a file system;
wherein the plurality of nodes are divided into source portions and replica portions;
wherein the controller is configured to:
determine a first data change in at least one of the plurality of nodes;
in response to determining the first data change, freeze the replica portions;
after freezing the replica portions, generate a first incremental snapshot of the at least one of the plurality of nodes from the replica portions, the first incremental snapshot comprising a portion of the at least one of the plurality of nodes;
upload an encrypted copy of the first incremental snapshot to a cloud storage;
update the metadata database by storing an entry associating the first incremental snapshot with the at least one of the plurality of nodes and unfreezing the replica portions;
determine a second data change in the at least one of the plurality of nodes;
compare the first data change and the second data change;
in response to determining the first data change and the second data change are different, freeze the replica portions;
after freezing the replica portions, generate a second incremental snapshot of the at least one of the plurality of nodes from the replica portions, the second incremental snapshot comprising a second portion of the at least one of the plurality of nodes and is smaller than the first incremental snapshot; and
uploading an encrypted copy of the second incremental snapshot to the cloud storage.

2. The system of claim 1, wherein the controller is configured to:
after uploading the encrypted copy, determine whether the first data change was captured in the first incremental snapshot;
in response to determining the first data change was not captured in the first incremental snapshot, generate a third incremental snapshot comprising a second portion of the at least one of the plurality of nodes; and
upload an encrypted copy of the third incremental snapshot to the cloud storage.

3. The system of claim 1, wherein the controller is configured to determine whether data in the at least one of the plurality of nodes has changed in response to a RESTful request from an input module.

4. The system of claim 1, wherein the controller is further configured to:
receive a recovery request comprising a data query;
identify hot data and cold data based on the data query and samples retrieved from a general log, the hot data comprising data files that have been accessed over a threshold number of times in a general data log, the cold data comprising data files that have been accessed less than the threshold number of times in the general data log;
query the metadata database to identify one or more incremental snapshots comprising the hot data;
pre-warm the backup tool by loading a portion of at least one of the one or more incremental snapshots;
determine whether to load the at least one of the one or more incremental snapshots;
fetch the at least one of the one or more incremental snapshots from the cloud storage; and
decrypt the at least one of the one or more incremental snapshots and storing decrypted snapshots in at least one of the plurality of nodes.

5. The system of claim 1, wherein:
each backup node is equipped with an internal backup tool; and
freezing the replica portions comprises:
determine whether the file system is in a low time;
in response to determining the file system is in a low time, freeze the replica portions; and
in response to determining the file system is not in a low time, schedule freezing the replica portions at a later time and delaying generation of a new incremental snapshot.

6. The system of claim 1, wherein the metadata database comprises a plurality of indices of references associating two or more incremental snapshots comprising the first and second incremental snapshot.

7. The system of claim 1, wherein the controller is further configured to:
receive a backup query specifying a data location;
determine a plurality of incremental snapshots associated with the data location, the one or more incremental snapshots comprise the first and the second snapshots;
download and decrypt the plurality of incremental snapshots; and
generate the replica portions based on the decrypted plurality of incremental snapshots.

8. The system of claim 6, wherein:
the backup tool encrypts and decrypts the two or more incremental snapshots; and the backup tool generates the two or more incremental snapshots from replica portions.

9. The system of claim 3, wherein:
the controller is configurable through the input module; and
the controller is configured to allow access to the first and second incremental snapshots while continuing fetching and decrypting the first and second incremental snapshots in the background.

10. A computer-implemented method for database backup comprising:
determining, by a controller coupled to a plurality of nodes coupled to a backup tool and accessed through a file system, a first data change in at least one of the plurality of nodes;
wherein the plurality of nodes are divided into source portions and replica portions;
in response to determining the first data change, freezing the replica portions;
after freezing the replica portions, generating a first incremental snapshot of the at least one of the plurality of nodes from the replica portions, the first incremental snapshot comprising a portion of the at least one of the plurality of nodes;
uploading an encrypted copy of the first incremental snapshot to a cloud storage; and
updating a metadata database by storing an entry associating the first incremental snapshot with the at least one of the plurality of nodes and unfreezing the replica portions;
determine a second data change in the at least one of the plurality of nodes;
compare the first data change and the second data change;
in response to determining the first data change and the second data change are different, freeze the replica portions;
after freezing the replica portions, generate a second incremental snapshot of the at least one of the plurality of nodes from the replica portions, the second incremental snapshot comprising a second portion of the at least one of the plurality of nodes and is smaller than the first incremental snapshot; and
uploading an encrypted copy of the second incremental snapshot to the cloud storage.

11. The computer-implemented method of claim 10, further comprising:
after upload the encrypted copy, determining, by the controller, whether the first data change was captured in the first incremental snapshot;
in response to determining the first data change was not captured in the first incremental snapshot, generating a third incremental snapshot comprising a second portion of the at least one of the plurality of nodes; and
uploading an encrypted copy of the third incremental snapshot to the cloud storage.

12. The computer-implemented method of claim 10, wherein the controller is configured to determine whether data in the at least one of the plurality of nodes has changed in response to a RESTful request from an input module.

13. The computer-implemented method of claim 10, further comprising:
receiving a recovery request comprising a data query;
identifying hot data and cold data based on the data query and samples retrieved from a general log, the hot data comprising data files that have been accessed over a threshold number of times in a general data log, the cold data comprising data files that have been accessed less than the threshold number of times in the general data log;
querying the metadata database to identify one or more incremental snapshots comprising the hot data;
pre-warming the backup tool by loading a portion of at least one of the one or more incremental snapshots;
determining whether to load the at least one of the one or more incremental snapshots;
fetching the at least one of the one or more incremental snapshots from the cloud storage; and
decrypting the at least one of the one or more incremental snapshots and storing decrypted snapshots in at least one of the plurality of nodes.

14. The computer-implemented method of claim 10, wherein:
each backup node is equipped with an internal backup tool; and
freezing the replica portions comprises:
determining whether the file system is in a low time;
in response to determining the file system is in a low time, freezing the replica portions; and
in response to determining the file system is not in a low time, scheduling freezing the replica portions at a later time and delaying generation of a new incremental snapshot.

15. The computer-implemented method of claim 10, wherein the metadata database comprises a plurality of indices of references associating two or more incremental snapshots comprising the first and second incremental snapshot.

16. The computer-implemented method of claim 15, wherein:
the backup tool encrypts and decrypts the two or more incremental snapshots; and
the backup tool generates the two or more incremental snapshots from the replica portions of the plurality of nodes.

17. The computer-implemented method of claim 12, wherein:
the controller is configurable through the input module; and
the controller is configured to allow access to the first and second incremental snapshots while continuing fetching and decrypting the first and second incremental snapshots in the background; and
the method further comprises:
receiving a backup query specifying a data location;
determining from one or more incremental snapshots associated with the data location;
downloading and decrypting the one or more incremental snapshots; and
generating the replica portions based on the decrypted one or more incremental snapshots.

18. A system for database backup comprising:
at least one processor; and
at least one memory device comprising instructions that when executed configure the at least one processor to perform operations comprising:
determining a first data change in at least one of a plurality of nodes;
wherein the plurality of nodes are divided into source portions and replica portions;
in response to determining the first data change, freezing a replica portions;
after freezing the replica portions, generating a first incremental snapshot of the at least one of the plurality of nodes from the replica portions, the first incremental snapshot comprising a portion of the at least one of the plurality of nodes;

uploading an encrypted copy of the first incremental snapshot to a cloud storage;

updating a metadata database by storing an entry associating the incremental snapshot with the at least one of the plurality of nodes and unfreezing the replica portions;

determine a second data change in the at least one of the plurality of nodes;

compare the first data change and the second data change;

in response to determining the first data change and the second data change are different, freeze the replica portions;

after freezing the replica portions, generate a second incremental snapshot of the at least one of the plurality of nodes from the replica portions, the second incremental snapshot comprising a second portion of the at least one of the plurality of nodes and is smaller than the first incremental snapshot;

uploading an encrypted copy of the second incremental snapshot to the cloud storage;

receiving a recovery request comprising a data query;

identifying hot data and cold data based on the data query and samples retrieved from a general log, the hot data comprising data files that have been accessed over a threshold number of times in a general data log, the cold data comprising data files that have been accessed less than the threshold number of times in the general data log;

querying the metadata database to identify one or more incremental snapshots comprising the hot data;

pre-warming the backup tool by loading a portion of at least one of the one or more incremental snapshots;

determining whether to load the at least one of the incremental snapshots;

fetching the second and the first incremental snapshots from the cloud storage; and decrypting the second and the first incremental snapshots and storing decrypted snapshots in at least one of the plurality of nodes.

\* \* \* \* \*